US012222716B2

(12) United States Patent
Kumavat et al.

(10) Patent No.: US 12,222,716 B2
(45) Date of Patent: Feb. 11, 2025

(54) METHOD AND SYSTEM FOR OPERATING AN AUTONOMOUS AGENT WITH A REMOTE OPERATOR

(71) Applicant: Gatik AI Inc., Palo Alto, CA (US)

(72) Inventors: Apeksha Kumavat, Palo Alto, CA (US); Arjun Narang, Palo Alto, CA (US); Gautam Narang, Palo Alto, CA (US); Dharmateja Kadem, Palo Alto, CA (US); Gunnar Newquist, Palo Alto, CA (US)

(73) Assignee: Gatik AI Inc., Mountain View, CA (US)

( * ) Notice: Subject to any disclaimer, the term of this patent is extended or adjusted under 35 U.S.C. 154(b) by 0 days.

(21) Appl. No.: 18/075,778

(22) Filed: Dec. 6, 2022

(65) Prior Publication Data

US 2023/0176573 A1    Jun. 8, 2023

Related U.S. Application Data

(60) Provisional application No. 63/286,448, filed on Dec. 6, 2021.

(51) Int. Cl.
  *G05D 1/00*    (2024.01)
  *B60W 50/02*   (2012.01)
  *B60W 60/00*   (2020.01)

(52) U.S. Cl.
  CPC ....... *G05D 1/0038* (2013.01); *B60W 50/0205* (2013.01); *B60W 60/001* (2020.02); *G05D 1/0225* (2013.01); *B60W 2556/45* (2020.02)

(58) Field of Classification Search
  CPC .............. G05D 1/0038; G05D 1/0225; B60W 50/0205; B60W 60/001; B60W 2556/45
  See application file for complete search history.

(56) References Cited

U.S. PATENT DOCUMENTS

| 9,315,178 B1 | 4/2016 | Ferguson et al. |
| 2010/0214085 A1 | 8/2010 | Avery et al. |
| 2013/0013178 A1 | 1/2013 | Brant et al. |

(Continued)

FOREIGN PATENT DOCUMENTS

WO    2019210148 A1    10/2019

OTHER PUBLICATIONS

Chiou, Manolis, et al., "Mixed-initiative Variable Autonomy for Remotely Operated Mobile Robots", ACM Transactions on Human-Robot Interaction, vol. 10, Article 37, publication date Sep. 2021.

*Primary Examiner* — Jess Whittington
(74) *Attorney, Agent, or Firm* — Jeffrey Schox; Diana Lin

(57) ABSTRACT

A system for operating an autonomous agent with a remote operator includes a remote subsystem, a local subsystem, and a communication subsystem. A method for operating an autonomous agent with a remote operator includes receiving and processing a set of inputs; presenting a set of outputs to a remote subsystem; receiving an input from a remote operator; and operating the autonomous agent. Additionally or alternatively, the method can include any or all of: detecting a failure and/or triggering a failure response; detecting a particular scenario associated with the autonomous agent; triggering a remote operator request; processing remote operator input; and/or any other processes.

22 Claims, 8 Drawing Sheets

(56) References Cited

U.S. PATENT DOCUMENTS

| | | | |
|---|---|---|---|
| 2016/0188574 A1* | 6/2016 | Homma | G06F 40/35 704/9 |
| 2016/0334229 A1 | 11/2016 | Ross et al. | |
| 2016/0334236 A1 | 11/2016 | Mason et al. | |
| 2017/0192423 A1 | 7/2017 | Rust et al. | |
| 2018/0059687 A1 | 3/2018 | Hayes et al. | |
| 2018/0215376 A1 | 8/2018 | Kuhara | |
| 2018/0329428 A1 | 11/2018 | Nagy et al. | |
| 2019/0049961 A1 | 2/2019 | Battles et al. | |
| 2019/0078896 A1 | 3/2019 | Zhu | |
| 2019/0138007 A1 | 5/2019 | Baghsorkhi et al. | |
| 2019/0310650 A1* | 10/2019 | Halder | G05D 1/0221 |
| 2020/0064863 A1 | 2/2020 | Tomita et al. | |
| 2020/0409368 A1* | 12/2020 | Caldwell | G05D 1/0212 |
| 2021/0035051 A1 | 2/2021 | Mains et al. | |
| 2021/0103880 A1 | 4/2021 | Wu | |
| 2021/0116907 A1* | 4/2021 | Altman | G05D 1/0088 |
| 2021/0155253 A1 | 5/2021 | Tiwari | |
| 2021/0165932 A1 | 6/2021 | Mohan et al. | |
| 2022/0382439 A1 | 12/2022 | Lewis et al. | |
| 2022/0410936 A1 | 12/2022 | Chengalvala | |
| 2023/0020040 A1 | 1/2023 | Tam | |
| 2023/0038372 A1 | 2/2023 | Yu et al. | |
| 2023/0063601 A1* | 3/2023 | Upadhyay | G07C 5/006 |
| 2023/0394975 A1 | 12/2023 | Kumavat et al. | |

\* cited by examiner

METHOD AND SYSTEM FOR OPERATING AN AUTONOMOUS AGENT WITH A REMOTE OPERATOR

CROSS-REFERENCE TO RELATED APPLICATIONS

This application claims the benefit of U.S. Provisional Application No. 63/286,448, filed 6 Dec. 2021, which is incorporated in its entirety by this reference.

TECHNICAL FIELD

This invention relates generally to the autonomous vehicle field, and more specifically to a new and useful system and method for operating an autonomous agent with a remote operator in the autonomous vehicle field.

BACKGROUND

In current autonomous vehicle platforms, receiving human input can be beneficial in numerous ways, such as in the event of an emergency or unknown situation, to help the autonomous agent better replicate human driving, to increase an overall safety associated with the vehicle, or any number of other use cases.

Conventional autonomous vehicles typically utilize human input in the form of a safety driver arranged onboard the vehicle. While teleoperation is a potential option for removing this safety driver, integrating the autonomous driving capabilities with input from a remote operator—while still leveraging the autonomous capabilities of the vehicle—is non-trivial to implement.

Thus, there is a need in the autonomous vehicle field to create an improved and useful system and method for operating an autonomous agent with a remote operator.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
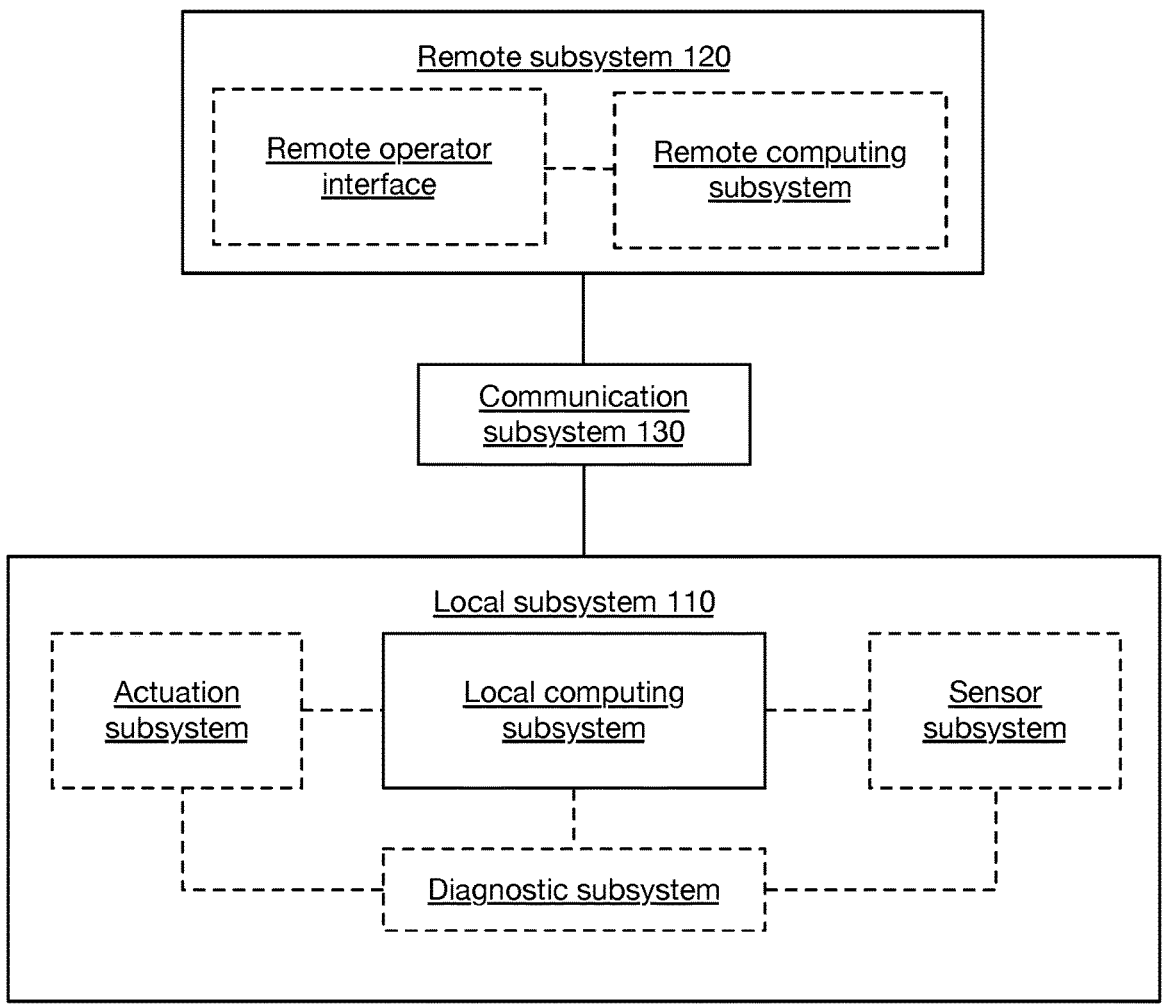
FIG. 1 is a schematic of a system for operating an autonomous agent with a remote operator.

As shown in FIG. 1, a system 100 for operating an autonomous agent with a remote operator includes a remote subsystem 120, a local subsystem 110, and a communication subsystem 130. Additionally or alternatively, the system can include any other components. Further additionally or alternatively, the system can include and/or interface with any or all of the components as described in U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, and U.S. application Ser. No. 17/962,459, filed 7 Oct. 2022, each of which is incorporated in its entirety by this reference.

Figure 2:
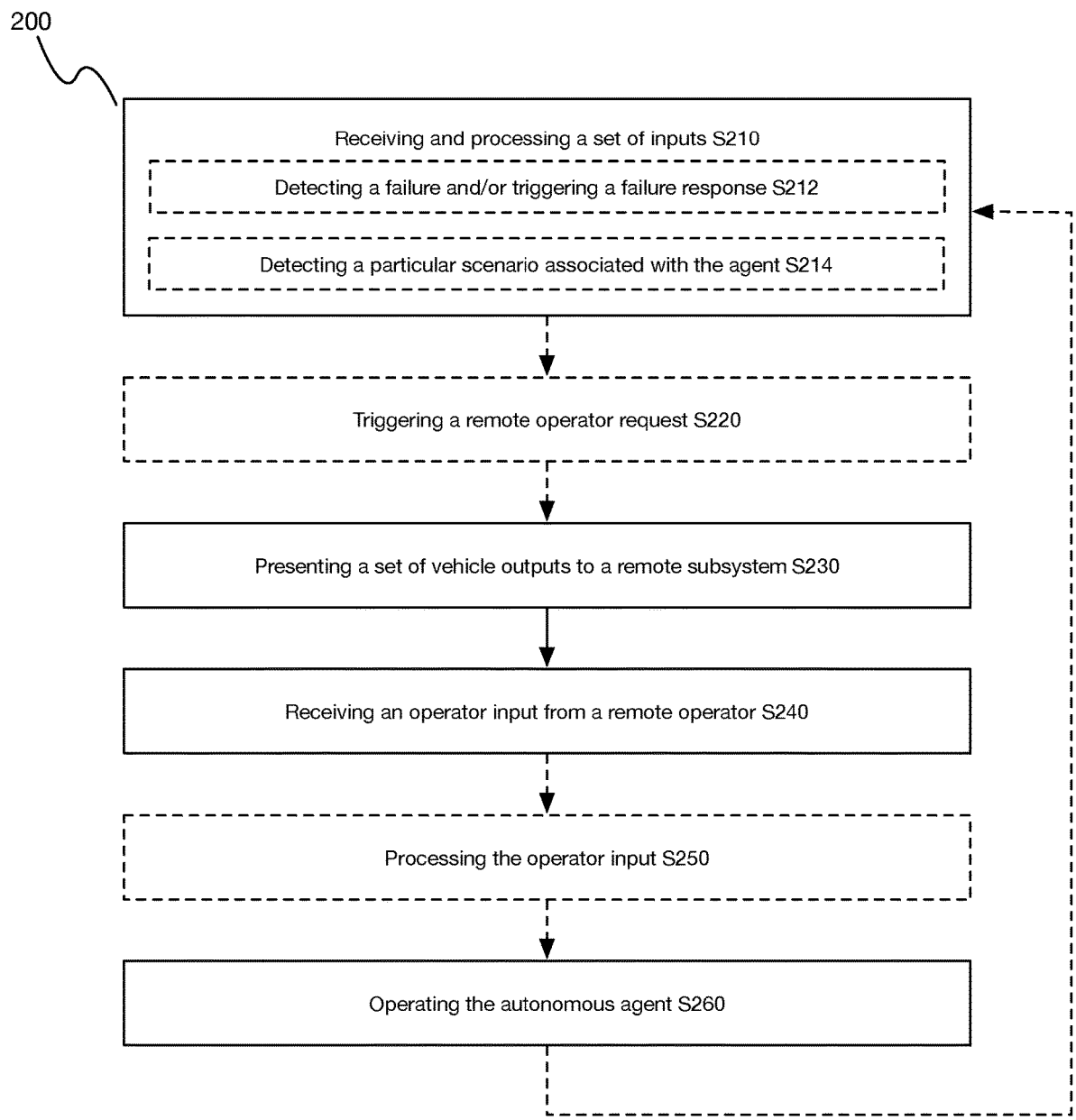
FIG. 2 is a schematic of a method for operating an autonomous agent with a remote operator.

As shown in FIG. 2, a method 200 for operating an autonomous agent with a remote operator includes receiving and processing a set of inputs S210; presenting a set of outputs to a remote subsystem S230; receiving an input from a remote operator S240; and operating the autonomous agent S260. Additionally or alternatively, the method 200 can include any or all of: detecting a failure and/or triggering a failure response S212; detecting a particular scenario associated with the autonomous agent S214; triggering a remote operator request S220; processing the input S250; and/or any other processes. Further additionally or alternatively, the method 200 can include and/or interface with any or all of the methods, processes, embodiments, and/or examples as described in: U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, and U.S. application Ser. No. 17/962,459, filed 7 Oct. 2022, each of which is incorporated in its entirety by this reference, or any other suitable processes performed in any suitable order. The method 200 can be performed with a system as described below and/or with any other suitable system.

2. Benefits

The system and method for operating an autonomous agent with a remote operator can confer several benefits over current systems and methods.

In a first variation, the technology confers the benefit of strategically and reliably integrating human-in-the-loop decision making with that of an autonomous agent, such that a human operator is not required to be onboard the autonomous agent while it is operating. The system and/or method further preferably confer the benefit of utilizing a remote operator in only a specific subset of scenarios, where the autonomous agent leverages any or all of the following in operating reliably on its own in a majority of scenarios: fixed routes, a limited operational design domain, redundant and robust hardware and software, and/or any other features. This can in turn enable a highly scalable remote operator platform, such that a single remote operator can monitor multiple autonomous agents simultaneously.

In a first set of specific examples, the remote operator (equivalently referred to herein as a human operator and/or a teleoperator and/or remote supervisor) is called (e.g., notified, alerted, contacted, etc.) in specified contexts where human input has been found to be beneficial and/or optimal and/or necessary for operating the autonomous vehicle.

In a second set of specific examples, additional or alternative to the first, the remote operator is called in response to detecting that a system failure has occurred and/or that a warning which could lead to a system failure has occurred.

In a second variation, additional or alternative to the first, the technology confers the benefit of validating inputs from remote operators prior to implementation, which functions to maintain safety standards and implement satisfactory actions based on numerous sources of information.

In a first example, the technology further confers the benefit of validating portions of remote operator inputs (e.g., in a batched fashion), such as initial waypoints in a series of waypoints entered by the remote operator, such that in an event that the initial waypoints do not satisfy the set of safety constraints and/or other satisfaction criteria, the remote operator can be notified and/or the additional waypoints can be not received and/or not processed by the autonomous vehicle (AV) logic (e.g., to preserve computational resources of the AV, to prevent wasting of time and/or attention of the remote operator in performing low value tasks, etc.).

Additionally or alternatively, the technology can be configured to provide only sets of options to teleoperators which have each already been validated and/or pre-validated (e.g., based on the vehicle's current environmental awareness), thereby preventing the remote operator from providing feedback which is not able to be performed (and/or would be unsafe to be performed) by the AV.

In examples, for instance, path options or any other input options (e.g., high-level behavior options, sets of waypoint options, etc.) provided to the remote operator are processed to check for safety validation prior to sending to the remote operator for review and/or selection.

In a third variation, additional or alternative to those described above, the system and/or method confer the benefit of leveraging input from a remote operator in multiple categories of use cases. In specific examples, for instance, a remote operator can be notified and his or her input requested in the use cases of: detecting that a minimal risk condition has been triggered and/or is anticipated to be triggered for the vehicle; detecting a specific context associated with the vehicle; detecting that the vehicle will potentially approach a scenario associated with high uncertainty in the future (e.g., such that a teleoperator can provide inputs which prevent the need to trigger an MRC); and/or any other use cases.

In a fourth variation, additional or alternative to those described above, the technology confers the benefit of preventing overly conservative and/or severe failure responses (e.g., coming to an immediate stop, pulling over, etc.) from being implemented by the vehicle if not necessary (e.g., not immediately necessary).

In a first set of examples, for instance, the technology confers the benefit of avoiding a false positive or overly conservative minimal risk maneuver (equivalently referred to herein as a minimal risk condition) or other failure response from being implemented through the ability to detect potential failures in a tiered manner (e.g., along a spectrum of severities), such that increasingly conservative minimal risk maneuvers can be implemented if the likelihood and/or severity of failure increases.

Additionally or alternatively, a request for remote operator input can be requested before a minimal risk maneuver is triggered and/or before a minimal risk maneuver is escalated, such that the remote operator has the opportunity to provide feedback which is tailored to the particular situation and/or assessed severity of the potential failure (e.g., warning vs. error), where in an event that the remote operator does not or cannot provide feedback within a designated decision-making window, the vehicle can proceed with autonomously electing more drastic failure responses.

In a fifth variation, additional or alternative to those described above, the technology confers the benefit of leveraging a fixed route use case, which can enable high accuracies (e.g., high predictive accuracies) to be associated with failure predictions (e.g., environmental/object uncertainties) made by the AV system (e.g., diagnostic subsystem), which can, in turn, enable most appropriate minimal risk maneuvers to be selected depending on the particular level of uncertainty and/or uncertainty type associated with the vehicle's environmental understanding.

Additionally or alternatively, the system and method can confer any other benefit.

3. System

As shown in FIG. 1, a system 100 for operating an autonomous agent with a remote operator includes a remote subsystem 120, a local subsystem 110, and a communication subsystem 130. Additionally or alternatively, the system can include any other components. Further additionally or alternatively, the system can include and/or interface with any or all of the components as described in U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, and U.S. application Ser. No. 17/962,459, filed 7 Oct. 2022, each of which is incorporated in its entirety by this reference.

The system 100 preferably interfaces with a set of one or more autonomous vehicles (equivalently referred to herein as an autonomous agents and/or vehicles), where the autonomous vehicle can be used for any or all of: transporting goods (e.g., for deliveries), transporting passengers, and/or any other functions. Additionally or alternatively, the system 100 can interface with any other vehicles, robotic devices, or any other devices. The vehicles are preferably autonomous vehicles (e.g., configured for full autonomous use, configured for Level 4 autonomy, configured for Level 5 autonomy, etc.), but can additionally or alternatively include semi-autonomous vehicles (e.g., Level 3 autonomy, Level 2 autonomy, Level 1 autonomy, etc.), manually driven and/or manually drivable vehicles, and/or any combination of vehicles. The vehicles preferably include delivery vehicles (e.g., trucks) configured for delivery of goods, but can additionally or alternatively include passenger vehicles, public transit vehicles, and/or any other vehicles.

Figure 6:
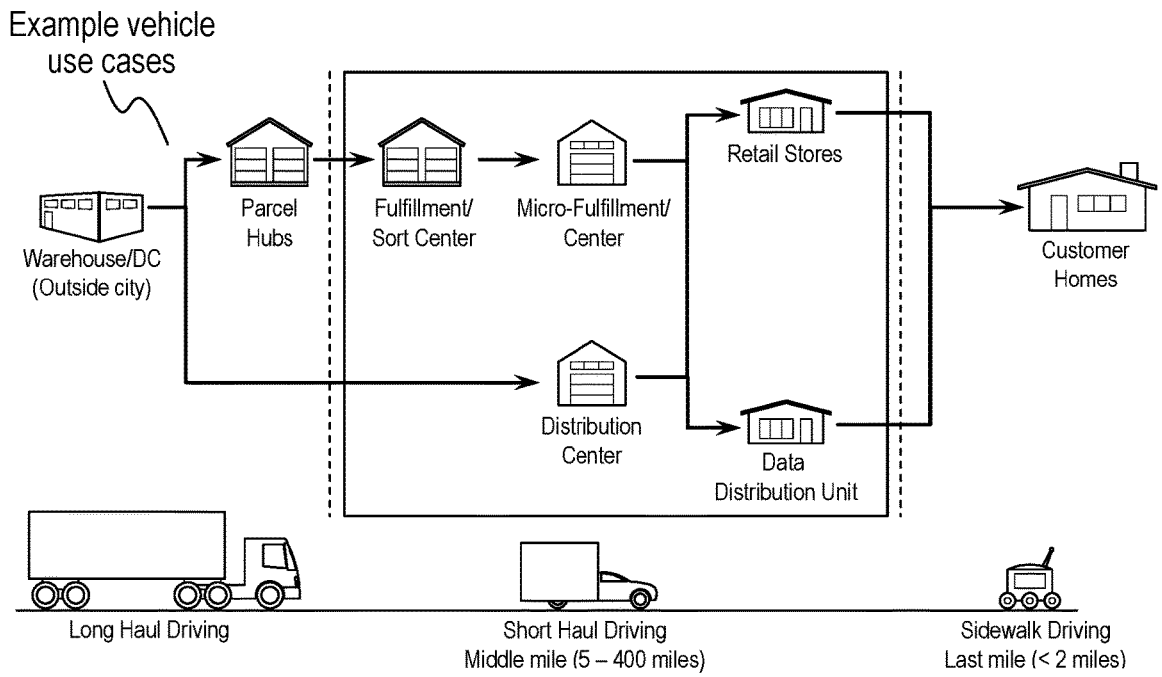
FIG. 6 depicts a use case of the system and/or method implemented in deliveries and a schematic of an associated fleet.
Figure 7:
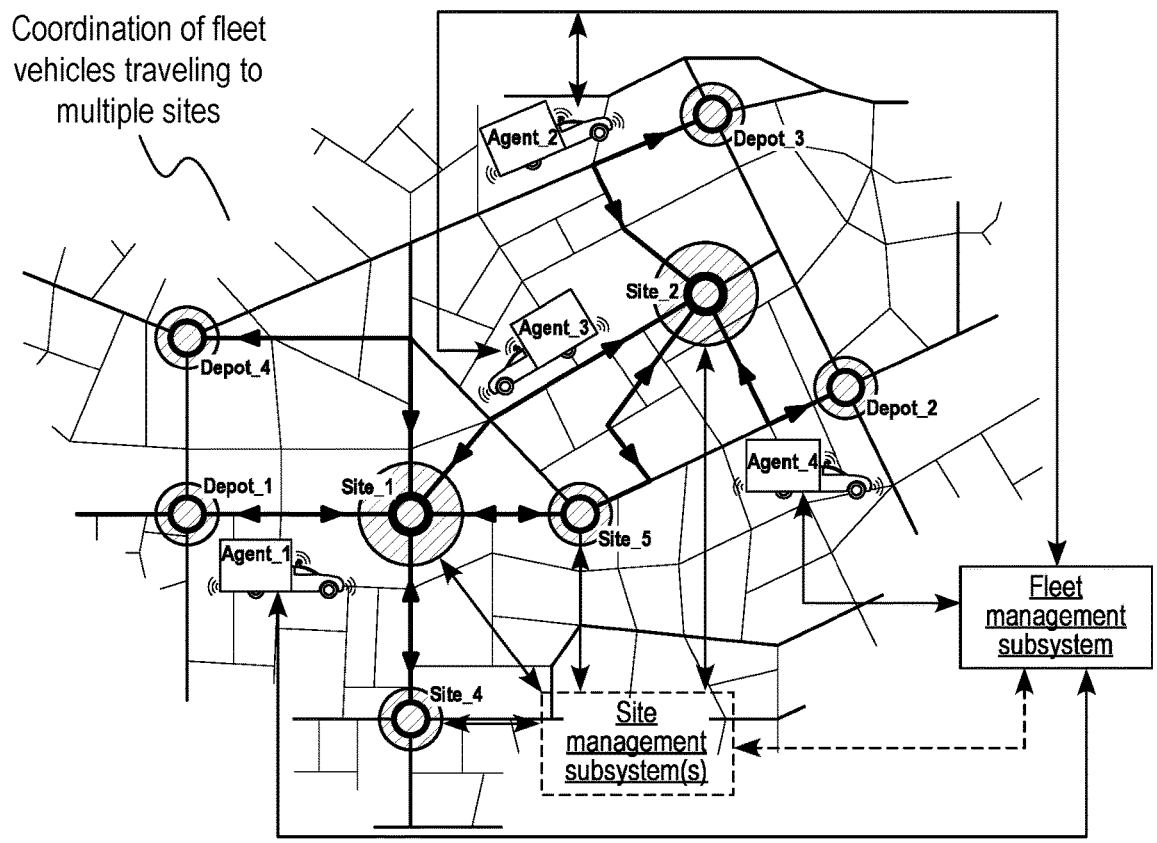
FIG. 7 depicts a fleet of vehicles traversing a fixed route network.

In a preferred set of variations (e.g., as shown in FIG. 6, as shown in FIG. 7, etc.), the set of autonomous vehicles are configured for use in association with short-haul logistics applications, such as those which use autonomous vehicles to deliver goods between destinations. The autonomous vehicles preferably perform these deliveries according to a set of fixed routes, but can additionally or alternatively follow dynamic routes and/or be otherwise operated.

3.1 System—Local subsystem 110

The system 100 preferably includes and/or interfaces with a local subsystem 110, which functions to operate (e.g., perform decision making for, control, maneuver, drive, etc.) the autonomous agent. Additionally or alternatively, the local subsystem 10 can function to detect one or more failures associated with the autonomous agent and/or any of the software associated with the autonomous agent; trigger a minimal risk condition operation mode; execute a minimal risk maneuver; alert a remote operator; determine a set of options to provide to a remote operator for input; receive, validate, and/or implement inputs from a remote operator; and/or can perform any other functions.

The local subsystem is preferably located fully onboard the autonomous agent. Additionally or alternatively, the local subsystem can be partially arranged offboard the autonomous agent, fully arranged offboard the autonomous agent, communicate with computing subsystems and/or other components arranged offboard the autonomous agent, communication with other autonomous agents (e.g., other vehicles in a fleet of AVs), and/or can arranged at any other locations and/or any combination of locations.

The local subsystem no preferably includes a local computing subsystem (equivalently referred to herein as the autonomous computing subsystem, autonomous computer, autonomous vehicle [AV] computing subsystem, autonomous vehicle [AV]computer, etc.), which functions to receive and process information with which to operate the autonomous agent (equivalently referred to herein as an autonomous vehicle and/or agent).

In preferred variations, for instance, the local computing subsystem implements AV logic which functions to operate the autonomous agent. Additionally or alternatively, the local computing subsystem can execute any other logic.

In a set of examples, the AV logic implements sets of learned models, such as, but not limited to, the learned micro-models as described in any or all of: U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, each of which is incorporated herein in its entirety by this reference.

Figure 9:
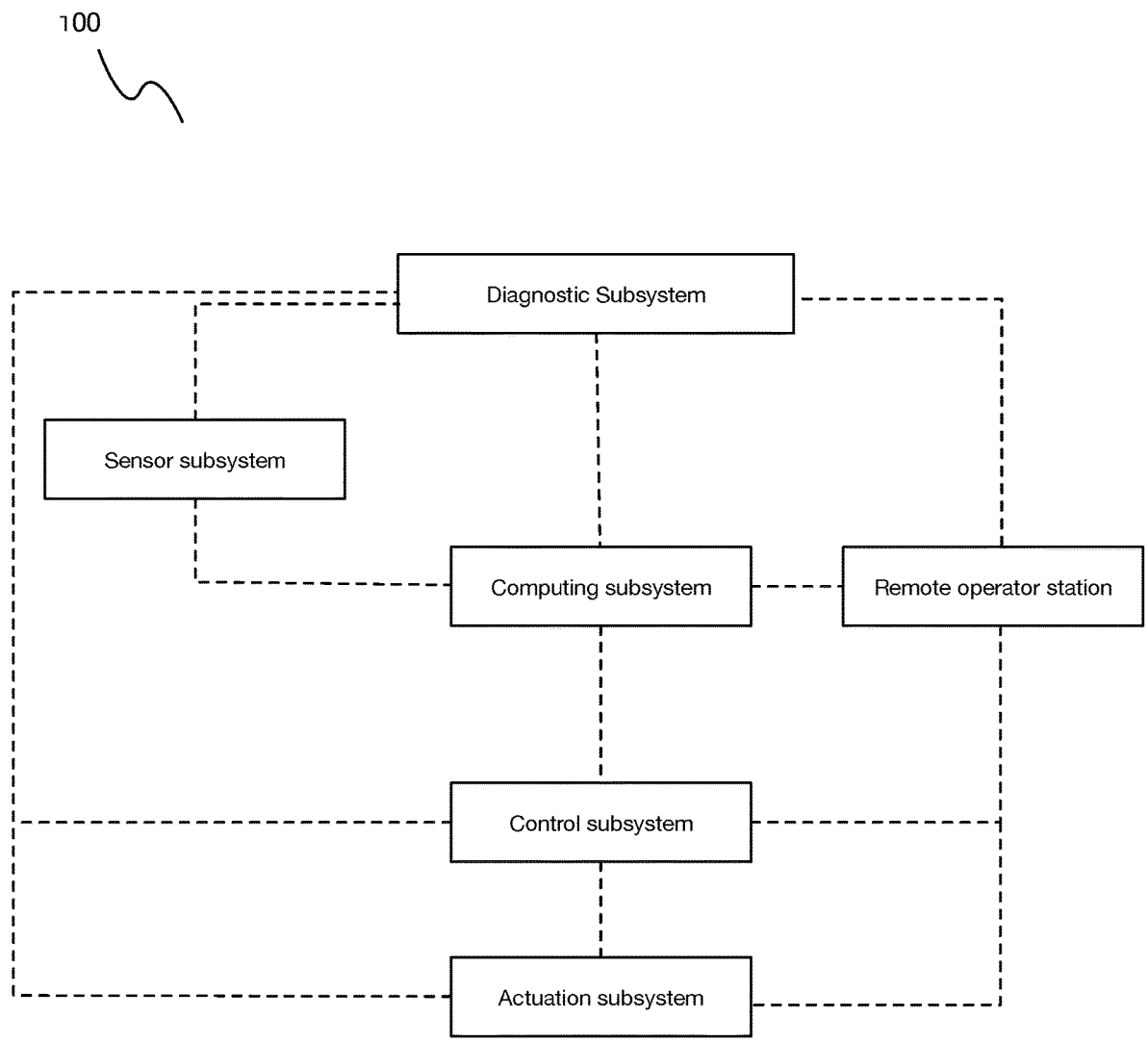
FIG. 9 depicts a schematic variation of the system.

The local computing subsystem preferably includes and/or interfaces with (e.g., is in communication with) a diagnostic subsystem (equivalently referred to herein as a failure detection subsystem and/or a health assessment subsystem, as shown in FIG. 9, etc.), which includes and/or interfaces with a set of one or more processors configured to monitor an overall health of the autonomous vehicle. The diagnostic subsystem further preferably functions to monitor communication between different modules/layers of the local computing subsystem, such as communication (e.g., information exchange) between the perception and prediction layers, between the prediction and planning layers, and/or between any other layers. Additionally or alternatively, the diagnostic subsystem can function to monitor a connection between the local and remote subsystems. For example, in an event that communication is lost with the remote subsystem, the diagnostic subsystem can be used to make such a detection (e.g., such that a failure response [e.g., minimal risk maneuver] can be selected and/or implemented).

Figure 4:
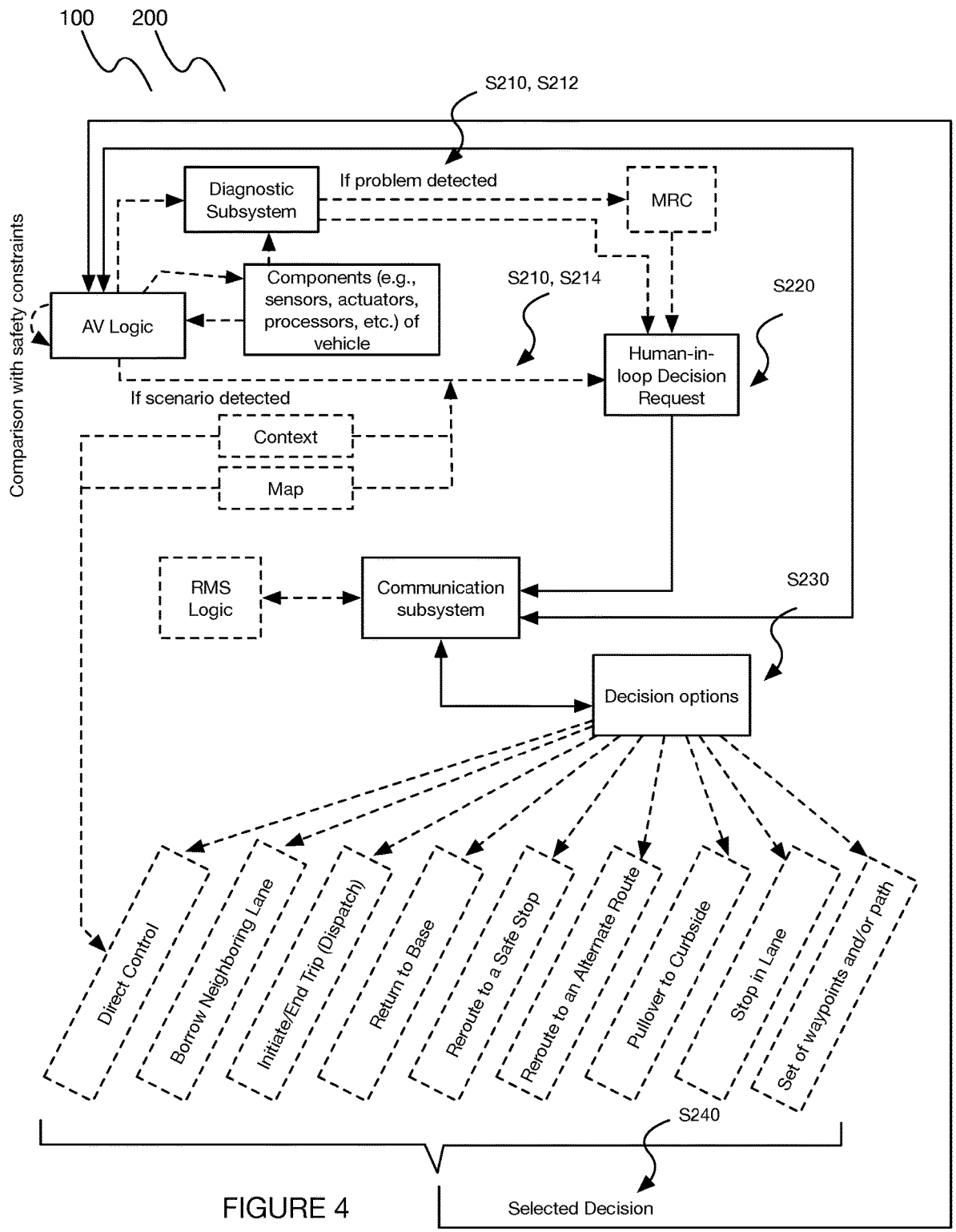
FIG. 4 depicts a schematic variation of a system for operating an autonomous agent with a remote operator and an associated method of use.

The diagnostic subsystem can further function to monitor the health of one or more hardware components (e.g., an actuation subsystem, sensor subsystem, etc.) and/or any other aspects of the autonomous agent. In an event that the diagnostic subsystem detects that a problem (equivalently referred to herein as a failure) has occurred (e.g., communication has been lost, the output of a layer cannot be validated/trusted, a hardware component has failed, etc.), a minimal risk condition (MRC) operation mode can be triggered (e.g., as shown in FIG. 4) and/or considered for the autonomous agent.

Figure 8:
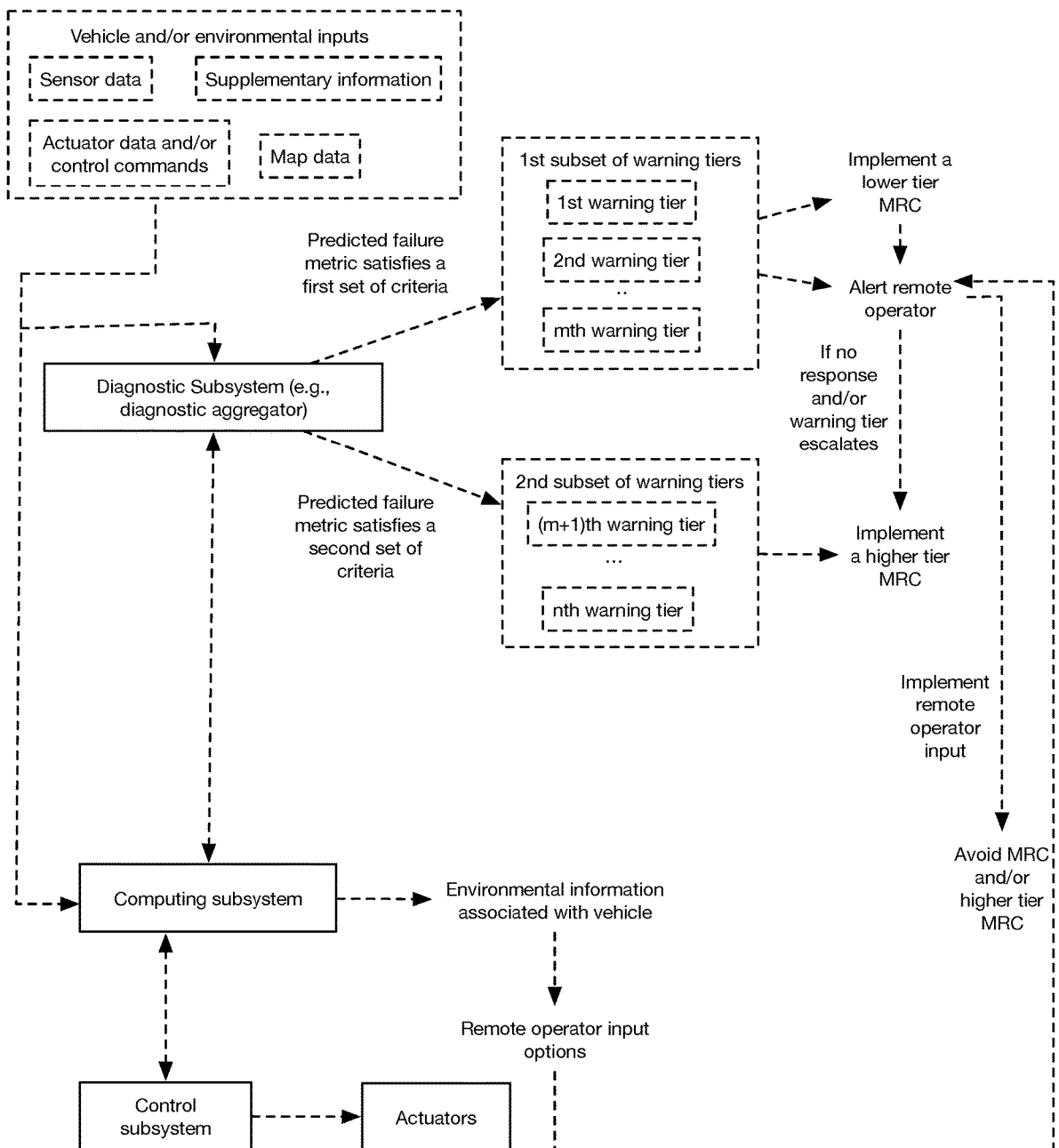
FIG. 8 depicts a variation of the implementation of the system and method in detecting and responding to a failure.

In some variations (e.g., as described below, as shown in FIG. 8, etc.), a set of different severity minimal risk maneuvers (e.g., organized in a tiered structure, ordered in a prioritized list of increasing severity, etc.) can be individually chosen and/or implemented depending on the type of failure or potential failure detected, whether or not the remote operator responds to an initial alert (e.g., within a predetermined time threshold), how the potential failure progresses or does not progress, the level of detected failure, and/or any other information.

In additional or alternative variations, a remote operator can be alerted prior to triggering one or more minimal risk maneuvers (e.g., an initial minimal risk maneuver, a less-conservative minimal risk maneuver in a prioritized list, etc.). Additionally or alternatively, a remote operator can be alerted after the vehicle has initiated and/or completed a minimal risk maneuver.

In a particular specific example, an MRC operation mode preferably includes executing the action of bringing the agent to a stop, but can additionally or alternatively involve any other behaviors and/or combination of behaviors, such as, but not limited to: flashing hazard lights, pulling over (e.g., off the road, to a shoulder, etc.), and/or any other behaviors.

In response to a failure being detected and a failure response (e.g., MRC) being triggered, the local subsystem preferably generates a decision request, equivalently referred to herein as a human-in-loop decision request, to be transmitted to the remote subsystem 120 for consideration by a remote operator. The local computing subsystem further preferably, in response to a failure mode being triggered, overrides any actions, behaviors, and/or trajectories that the local subsystem was planning to implement for the autonomous agent, such that the autonomous agent does not proceed as originally planned (as this may no longer be safe and/or optimal due to the detected problem). Additionally or alternatively, any other actions can be triggered, and/or the process can be otherwise implemented.

Additionally or alternatively, a human-in-loop decision request can be triggered in response to detecting a particular scenario (e.g., context) associated with the autonomous agent, such as a particular scenario (e.g., from a predetermined set of scenarios) where human input has been found to be beneficial to leverage. These scenarios can include those in which the agent may need or want to perform a behavior which the autonomous computer cannot permit on its own (e.g., driving into a lane which has opposing traffic), those in which it has been determined that a human will operate better (e.g., moving into a dynamically changing loading and/or unloading zone), and/or any other scenarios.

Figure 3:
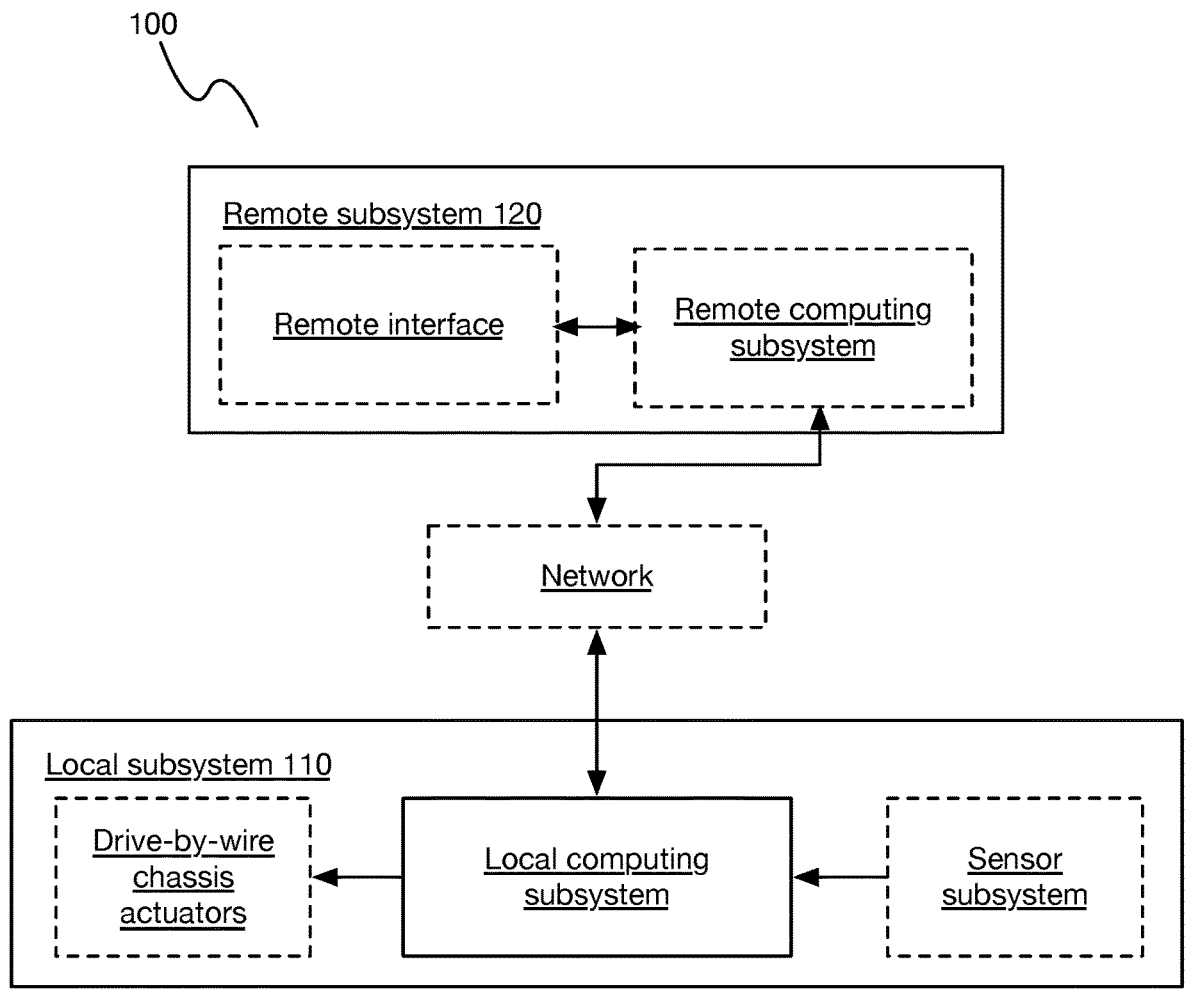
FIG. 3 depicts a schematic variation of a system for operating an autonomous agent with a remote operator.

The local subsystem can optionally include and/or interface with an actuation subsystem, which functions to drive the autonomous agent. The actuation subsystem is preferably part of a drive-by-wire system of the autonomous agent and includes a set of drive-by-wire actuators (e.g., chassis actuators, as shown in FIG. 3, etc.), such as a brake-by-wire subsystem, a steer-by-wire subsystem, and a throttle-by-wire subsystem, but can additionally or alternatively include a subset of these, any or all of these components in a non-drive-by-wire form, and/or any other actuation components.

The local subsystem can optionally include and/or interface with a sensor subsystem, which functions to receive information associated with the agent's environment with which to operate the autonomous agent. Additionally or alternatively, the sensor subsystem can function to receive information (e.g., video streams) to provide to a remote operator, detect failures associated with the autonomous agent (e.g., hardware failures), and/or can perform any other functions. The sensor subsystem preferably includes a set of cameras, and optionally one or both of LiDAR sensors and RADAR sensors, but can additionally or alternatively include a set of sensors configured to monitor a health of any or all components (e.g., actuation components, sensors described above, etc.) of the agent, and/or any other sensors.

Additionally or alternatively, the local subsystem can include and/or interface with any other components, such as, but not limited to: a control subsystem configured to implement control commands for operation of the autonomous agent; storage/memory; and/or any other components.

3.2 System—Remote Subsystem 120

The system 100 includes a remote subsystem 120, which functions to provide an interface with a remote operator, such that outputs can be provided to and inputs received from the remote operator. Additionally or alternatively, the remote subsystem can perform any other functions.

The remote subsystem is preferably arranged into a set of remote monitoring stations (RMSs), which are locations at which the remote operators (equivalently referred to herein as teleoperators, operators, and/or supervisors) are arranged, preferably along with a set of remote interfaces, a remote computing subsystem, and optionally any other components. Additionally or alternatively, any or all of the remote subsystem can be arranged at multiple locations, partially arranged onboard the autonomous agent, and/or otherwise arranged.

The remote subsystem is preferably in communication with the local subsystem 110 via the communication subsystem 130, but can additionally or alternatively be in communication with any other components.

The remote subsystem preferably includes a set of remote interfaces (equivalently referred to herein as remote operator interfaces), which function to provide outputs to the remote operators and to receive inputs from the remote operators. The remote interface can include any or all of: output devices (e.g., displays, speakers, etc.), input devices (e.g., touch screen displays, joysticks, simulator systems, actuation components with associated sensors, etc.), and/or any other devices. The outputs provided to the remote operators preferably include sensor information (e.g., camera streams) collected onboard the autonomous agent, which functions to provide the remote operator with an awareness and understanding of the autonomous agent's surroundings. The inputs received from the operator can include (e.g., as described below) decision selections, control commands (e.g., via a joystick, via a braking simulator, etc.), and/or any other inputs.

The remote subsystem preferably further includes a remote computing subsystem, which implements remote subsystem logic and functions to process any or all of the inputs received from the remote operators. Additionally or alternatively, the remote computing subsystem can perform any other functions, any or all of the remote subsystem logic can be implemented at the local computing subsystem, and/or the computing can be otherwise arranged.

Additionally or alternatively, the remote subsystem 120 can include any other components.

3.3 System—Communication Subsystem 130

The system 100 includes a communication subsystem 130, which functions to establish communication and the exchange of information between the local subsystem 110 and the remote subsystem 120. In preferred variations, the communication subsystem 130 includes a relay server (e.g., with multi-channel bonding), but can additionally or alternatively include any other servers, communication components and/or communication protocols (e.g., wireless communication, wired communication, WiFi, Bluetooth, radio, etc.), and/or components.

4. Method

As shown in FIG. 2, the method 200 includes receiving and processing a set of inputs S210; presenting a set of outputs to a remote subsystem S230; receiving an input from a remote operator S240; and operating the autonomous agent S260. Additionally or alternatively, the method 200 can include any or all of: triggering a failure response mode and/or failure response S212; detecting a particular scenario associated with the autonomous agent S214; triggering a remote operator request S220; processing the input S250; and/or any other processes. Further additionally or alternatively, the method 200 can include and/or interface with any or all of the methods, processes, embodiments, and/or examples as described in: U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, and U.S. application Ser. No. 17/962,459, filed 7 Oct. 2022, each of which is incorporated in its entirety by this reference.

4.1 Method—Receiving and Processing a Set of Inputs S210

The method 200 preferably includes receiving and processing a set of inputs S210, which functions to receive information with which to operate the autonomous agent, wherein operation of the autonomous agent can occur autonomously, with human (e.g., remote operator, onboard human operator, etc.) input, semi-autonomously, in any other operation modes, and/or in any combination of operation modes. S210 can additionally or alternatively function to determine which of these modes to operate in, detect a trigger and/or transition between these modes (e.g., based on detection of a failure), and/or can perform any other suitable functions.

Additionally or alternatively, the method 200 can be performed in absence of S210 and/or with a modified version of S210 (e.g., wherein any or all of the inputs are stored, wherein any or all of the inputs are pre-processed, etc.).

S210 is preferably performed initially during the method 200, and further preferably multiple times (e.g., continuously, at a predetermined frequency, etc.) during operation of the autonomous agent, such as continuously and/or near continuously (e.g., at a predetermined frequency) as data is collected at one or more sensors onboard the AV (e.g., throughout route traversal of the AV). In some variations, for instance, S210 is performed and/or triggered according to a predetermined frequency associated with a perception subsystem (e.g., as implemented at the computing subsystem) of the vehicle. Additionally or alternatively, S210 can be performed at any other times, triggered based on any suitable inputs, and/or otherwise suitably performed.

The inputs are preferably processed at the local computing subsystem (e.g., with the AV logic), but can additionally or alternatively be processed at any other computing subsystems.

The set of inputs received in S210 are preferably at least partially associated with the vehicle and/or its environmental surroundings (e.g., environment perceivable by sensors of the AV), but can additionally or alternatively be received from and/or associated with: other vehicles (e.g., other AVs in a fleet, other vehicles in an environment of the AV, etc.); general environmental conditions such as those that might apply to the vehicle (e.g., weather conditions, traffic conditions, etc.); remote operator inputs and/or information (e.g., status, availability, etc.); and/or any other inputs can be received, determined, and/or retrieved in S210.

The inputs received in S210 preferably include sensor data (e.g., sensor streams) received from a set of sensors (e.g., cameras, LiDARs, RADARs, etc.) onboard the autonomous agent, where the sensor data are used by the autonomous agent (e.g., through processing with perception and/or prediction and/or planning modules/protocols/processes of the computing subsystem) to determine how to drive the AV (e.g., determine which actions to perform, determine which trajectories to take, etc.). The sensor data further preferably functions to provide information for use in decision-making (e.g., option selection, input determination, etc.) of remote operators and/or onboard operators, such that the operators are aware of the vehicle's environmental surroundings (e.g., as represented by sensor data) and/or potential failures associated with the vehicle and/or its environmental understanding (e.g., based on an obstructed camera view, based on failed sensor resulting in sensor shutdown, missing sensor data due to power loss, etc.). In some variations, for instance, at least a portion of the sensor streams are transmitted (e.g., via the communication subsystem 130) to the remote subsystem 120 (e.g., user interfaces such as displays) such that the remote operators have an awareness of the autonomous agent's surroundings for monitoring the agent and/or for use in any decision-making performed by the remote operators (e.g., as described below). Additionally or alternatively, processed and/or modified sensor data (e.g., annotated sensor streams, aggregated sensor streams [e.g., camera data with overlays from Lidar and/or Radar data], prioritized sensor streams and/or sensor stream subsets [e.g., only camera data], etc.) can be provided to operators, alerts (e.g., audio alerts, visual alerts [e.g., annotations], tactile alerts at remote monitoring stations, etc.) can be provided to operators, and/or any other information can be provided to operators. Further additionally or alternatively, sensor data can be received from sensors remote from (e.g., offboard) the AV, such as, but not limited to, sensors onboard another vehicle (e.g., fleet vehicle, non-fleet vehicle, etc.), sensors arranged in an environment of the vehicle (e.g., fixed to environmental infrastructure, fixed to static objects in the vehicle's environment, fixed to moving objects in the vehicle's environment, etc.), and/or any other sensors.

The inputs can additionally or alternatively include any other information, such as, but not limited to: a set of maps (e.g., which are utilized by the AV and/or operators for decision-making), environmental information (e.g., weather information, traffic information, AV site information [e.g., loading dock information, AV base station information, etc.], fleet management information, information from other fleet vehicles [e.g., enabled via vehicle-to-vehicle communication], database information and/or information stored in memory, and/or any other information.

In some variations, for instance, the set of inputs can include fleet information associated with a fleet of AVs (e.g., set of multiple vehicles which are collectively used in a particular use case and/or within a particular fixed route network), such as any or all of the information utilized in the management of a fleet as discussed in U.S. application Ser. No. 17/962,459, filed 7 Oct. 2022, which is incorporated herein in its entirety by this reference. The fleet information can be received from any or all of: other vehicles in the fleet (e.g., via vehicle-to-vehicle communication); a fleet management subsystem (e.g., fleet management software, fleet management operators, etc.); customers arranged at a site associated with the AVs (e.g., inputs received from site workers at a customer interface, inputs associated with loading docks, etc.); and/or any other information sources.

Additionally or alternatively, the set of inputs can include any other information.

Processing the set of inputs preferably functions to determine if a request to a remote operator should be triggered in S220 (e.g., in response to detection of a failure associated with the AV, in response to a characterization of a detected failure, in response to the detection and/or classification of a particular environment and/or scenario associated with the AV, etc.). Additionally or alternatively, processing the set of inputs can function to: determine which type of request to trigger, determine when to trigger the request, determine which options and/or type(s) of options (e.g., high-level behavior vs. path vs. waypoints, etc.) to provide the remote operator, and/or the processing of inputs can be otherwise suitably used.

Additionally or alternatively, the inputs can be processed and used in the autonomous decision-making and operation of the AV (e.g., to autonomously determine a behavior and/or action and/or trajectory and/or control commands for the autonomous agent under normal autonomous operation), and/or to perform any other functions.

S210 preferably includes detecting (e.g., checking for) a failure and/or triggering a failure response S212, which functions to determine if the performance of the vehicle and/or any associated components (e.g., sensors, actuators, etc.) or processes (e.g., computing subsystem operation) has been compromised and/or is predicted to be (or will be) compromised, such that an optimal, safe action can be triggered in response. Additionally or alternatively, S212 can function to assess and/or characterize the failure, such as: the failure type (e.g., which components are affected), the failure source/cause, a severity and/or urgency associated with the failure, and/or any other features of the failure. Further additionally or alternatively, S212 can function to prevent unnecessary (e.g., in response to a false positive failure detection) and/or overly conservative responses from being triggered in response to a potential failure detection.

S212 can optionally further function to trigger and/or inform the performance of any or all other processes of the method 200.

S212 is preferably performed with a diagnostic subsystem (e.g., diagnostic subsystem module of a processing and/or computing subsystem, set of processors, etc.), such as, but not limited to, a diagnostic subsystem as described above. Additionally or alternatively, any other diagnostic subsystem and/or processing subsystem can be used.

The diagnostic subsystem preferably functions to determine (e.g., check) the status (e.g., health) of the whole vehicle (e.g., collective combination of components, collective combination of components which are susceptible to failure, etc.), but can additionally or alternatively function to determine a status of a one or more components of the vehicle, multiple vehicles, and/or any other systems, subsystems, and/or components.

In a preferred set of variations, the diagnostic subsystem functions to aggregate status and/or health and/or performance information from multiple (e.g., all, all being analyzed, etc.) components (e.g., sensors, processors, computers, power supplies, communication subsystems, etc.) of the vehicle or associated with the vehicle (e.g., components in communication with the vehicle, controls of the remote operator station, etc.), and is equivalently referred to herein as a diagnostic aggregator and/or diagnostic aggregator subsystem (e.g., including processors configured for diagnostic evaluation and aggregation).

The diagnostic subsystem is preferably configured to receive at least data from sensors associated with the vehicle (e.g., onboard sensors, offboard sensors in communication with the vehicle, etc.), but can additionally or alternatively be configured to receive any or all of: control commands provided to and/or implemented by the vehicle (e.g., by actuators of the vehicle), outputs and/or intermediate outputs of processing and/or computing subsystems of the vehicle (e.g., outputs of perception and/or prediction and/or planning modules/subsystems, outputs of the AV logic, outputs of a set of trained machine learning models used for action selection and/or trajectory generation of the vehicle, etc.), uncertainties associated with outputs and/or intermediate outputs of computing and/or processing subsystems of the vehicle (e.g., as described in U.S. application Ser. No. 17/127,599, filed 18 Dec. 2020, which is incorporated herein in its entirety by this reference), and/or any other information.

In some variations, for instance, the diagnostic subsystem expects data from sensors and/or other information determined and/or communicated at the vehicle (e.g., control commands communicated to actuators) to be sent in accordance with predetermined temporal parameters (e.g., predetermined rate or range of rates, predetermined frequency or range of frequencies, at a predetermined time or set of times, within a predetermined delay or range of delays relative to data generation and/or data receipt at another component, etc.), wherein in an event that transmission and/or receipt of the data falls outside of the expected temporal parameters, an alert of a potential failure can be triggered (e.g., as described below).

Additionally or alternatively, the diagnostic subsystem can take into account (e.g., process, analyze, etc.) any or all information (e.g., inputs, outputs, intermediate outputs, etc.) associated with the AV's software stack (e.g., AV logic, models and/or algorithms executed at the AV's computing and/or processing subsystem, etc.), such as uncertainty metrics (e.g., as determined with anomaly detection and/or out-of-distribution processes) associated with inputs and/or outputs of the AV software stack, such as, but not limited to, any or all of those described in U.S. application Ser. No. 17/127,599, filed 18 Dec. 2020, which is incorporated herein in its entirety by this reference.

In a set of examples, the diagnostic subsystem is able to detect and characterize failure with a high degree of accuracy and confidence due, at least in part, to a fixed route use case of the set of vehicles. This can enable, for instance, out-of-distribution detectors and/or anomaly detectors to determine, with a high degree of accuracy and confidence, whether or not detected objects and/or environments of the vehicle have been seen before (e.g., as the vehicles travel the same routes over and over).

Additionally or alternatively, the diagnostic subsystem can process any other information and/or be used in any suitable use cases.

The diagnostic subsystem can process any or all of this data: individually, in an aggregated fashion, and/or in any combination of ways.

The diagnostic subsystem preferably produces as output(s) a set of one or more scores (e.g., health scores, failure scores, performance scores, status scores [e.g., on, off, communicating, not communicating, etc.], etc.) associated with the vehicle, wherein the scores can be any or all of: calculated with a set of models and/or algorithms (e.g., rule-based models and/or algorithms, learned and/or trained models and/or algorithms [e.g., machine learning models, deep learning models, neural networks, etc.], equations, etc.); received directly from and/or aggregated (e.g., according to a predetermined equation, summed, averaged, used to find a median, etc.) based on inputs received from components (e.g., sensor data, information receipt times, signal strengths, etc.) of the system; determined with a lookup table and/or decision tree; determined in any combination of ways; and/or otherwise suitably determined.

The outputs (e.g., aggregated health score(s) of the vehicle) and/or intermediate outputs of the diagnostic subsystem (e.g., health scores of individual components) are preferably compared (e.g., at the diagnostic subsystem, at processing and/or computing subsystems in communication with the diagnostic subsystem, etc.) with a set of thresholds and/or satisfaction criteria, which can function to: determine if a failure is detected and/or is suspected to be present; characterize a failure type and/or features (e.g., severity, confidence, etc.) associated with a failure; trigger a failure response for the vehicle; trigger a remote operator request; determine conditions (e.g., timing) associated with triggering a failure response and/or a remote operator request; inform the determination of input options to provide to a remote operator (e.g., with the remote operator request); and/or can perform any other functions.

In preferred variations, for instance, one or more health scores produced by the diagnostic subsystem are compared with a set of predetermined thresholds such that a potential failure can be detected and/or characterized (e.g., based on a likelihood/confidence of occurrence [e.g., likelihood that potential failure is a false positive], an anticipated severity, etc.). In some examples, for instance, an aggregated health score produced with the diagnostic subsystem is compared with a set of one or more thresholds, where potential failures can be distinguished (e.g., more granularly assessed) from each other based on the comparison with the threshold(s). In specific examples, for instance, potential failures are categorized into one of at least two categories, wherein the first category indicates that the potential failure should be treated as a warning (e.g., potential error/failure) and the second category indicates that the potential failure should be treated as an error/failure. In a particular implementation, the error category requires that an aggregated health score of the system fall below a lower threshold than that of the warning category. Additionally or alternatively, individual health scores can be compared with thresholds, a number of potential failures (e.g., within a predetermined time frame) can be used to categorize the failure, and/or a failure can be otherwise suitably detected and/or categorized. Inversely, a predicted failure score can indicate a warning if it exceeds a first predetermined threshold, and the predicted failure score can indicate an error/failure if it exceeds a second predetermined threshold (e.g., higher than the first predetermined threshold).

Additionally or alternatively, any other potential categories can be implemented. In another set of specific examples, for instance, a set of multiple categories can be selected from, which indicate, for instance: that the vehicle is performing normally, that the vehicle is at risk for a failure (e.g., warning of a failure), that the vehicle is encountering a failure, and/or any other indications. The categories can optionally further indicate and/or suggest the degree to which the vehicle will handle (e.g., autonomously respond to) the failure versus the degree to which the remote operator will have the opportunity to respond to the failure. In a particular specific example, for instance, a first category indicates that no failure is detected; a second category indicates that a warning threshold has been exceeded and that the remote operator should be alerted (e.g., so that they have the opportunity to intervene before the warning progresses to an error, so that they can confirm that a failure is present, so that they can confirm that the warning is a false positive and no indication of failure is present, etc.); and a third category indicates that a failure is determined (e.g., with confidence above a predetermined threshold) to have occurred and that a minimal risk maneuver should/will be implemented by the vehicle (e.g., without remote operator input).

Additionally or alternatively, any or all of the categories can indicate a failure type and/or failure severity, such as, but not limited to: an indication of which components have failed, an indication of the number of components that have failed (e.g., simultaneously failed), an indication of the importance and/or priority associated with the failed components (e.g., entire computing system failure vs. redundant sensor failure), and/or any other features associated with the failure can be determined.

Additionally or alternatively, any or all of the failure characterization/classification/categorization can be performed based on temporal parameters associated with the failure detections, number counts of the detections, and/or other parameters.

For instance, producing and analyzing outputs of the diagnostic subsystem (e.g., diagnostic aggregator) can optionally be performed in accordance with a moving window (e.g., sliding window) analysis, which processes inputs received at the diagnostic subsystem (e.g., diagnostic aggregator) and/or produces outputs with the diagnostic aggregator in accordance a frequency (e.g., predetermined frequency), such as with a moving time window process, wherein data from a first window of time is processed to produce a first set of health scores, data from a second window of time is processed to produce a second set of health scores, and so on. This can function to handle naturally occurring uncertainties and/or noise in sensors or other sources of data received at the diagnostic subsystem without triggering false positive reactions, since the evolving of the health score(s) over time can be determined and utilized. For instance, if there is a sudden spike (or drop) in value of a health score, a warning (e.g., as described above) can be made, but a drastic minimal risk maneuver does not necessarily need to be immediately triggered—rather, the evolving of the score(s) and/or pattern(s) in the number or occurrence of scores can be monitored for further decision-making. For instance, if a failure or potential failure is detected less than a predetermined number of times within a predetermined time threshold, the potential failure can be flagged as a warning, whereas if a potential failure is detected continuously and/or more than a predetermined number of times within a predetermined time threshold (e.g., at each of a set of n successive time windows, at more than m windows within a set of n windows, etc.), an error in the vehicle can be determined (e.g., escalated from a warning).

In variations implementing moving time windows, the window can be independent from each other (e.g., next window starts when previous window ends), overlapping (e.g., partially overlapping, fully overlapping, etc.), or any combination. The windows can be of the same time duration, different time durations, or any combination.

In a set of examples, multiple features of a detected potential failure can be aggregated together and used to assess next steps in triggering a failure response and/or remote operator request (e.g., as described below). In specific examples, for instance, the number of times that a warning occurs can be used to trigger a first response whereas the number of times that an error occurs can be used to trigger a second response (e.g., different than the first response).

Triggering a failure response can include any or all of: triggering a remote operator request S220, operating (e.g., autonomously operating) the vehicle according to a minimal risk condition (MRC) and/or in accordance with the performance of a minimal risk maneuver (e.g., stopping, pulling over, braking, etc.), implementing a first response of a set of multiple failure responses (e.g., tiered, successive failure responses, etc.), and/or any combination.

The type of failure response triggered (e.g., minimal risk maneuver vs. remote operator request) is preferably determined based on health scores or other outputs produced by the diagnostic subsystem, but can additionally or alternatively be performed based on the characterizations of the health scores (e.g., warning vs. error), temporal parameters associated with the health scores, other features of the health scores, and/or any other information.

In a set of variations, for instance, once the diagnostic aggregator determines a level of uncertainty and/or warning and/or error associated with the vehicle, there are multiple tiers of minimal risk maneuver that the vehicle can take depending on the health score and/or its features, wherein any or all of the maneuvers can further interface with remote operator feedback. In some examples, for instance, maneuvers can be organized into a tiered fashion of increasing intensity (e.g., require more effort to resume normal operation of the vehicle afterward, ordered in increasing braking magnitudes required by the vehicle, ordered in increasing deceleration rates associated with the vehicle, ordered in increasing speed decreases performed by the vehicle, ordered from a "slowing down" behavior to an "immediate stopping" behavior, as shown in FIG. 8, etc.), wherein remote operator feedback can be requested and/or received prior to initiation of (e.g., between a $1^{st}$ and $2^{nd}$ maneuver) any or all of the minimal risk maneuver, which can function, for instance, to not rely on the receipt of remote operator input for the vehicle to respond safely to failures while also attempting to prevent severe minimal risk maneuvers from being implemented when not needed.

Examples of minimal risk maneuvers can include, but are not limited to: the vehicle reducing its speed (e.g., braking), the vehicle coming to a stop, the vehicle pulling over to a shoulder or far lane (e.g., curbside) or designated stopping area, and/or any other maneuvers.

In a specific example involving tiered minimal risk maneuvers, for instance, in response to detecting a warning or failure, the vehicle can initiate (e.g., autonomously initiate) a first minimal risk maneuver (e.g., slowing down) while providing a remote operator request for input (e.g., within a predetermined time frame) before the vehicle initiates a more intense minimal risk maneuver (e.g., coming to a stop) which is more difficult for the vehicle to resume normal operation afterward (e.g., requires direct control from a human onboard the vehicle or remote operator, requires a human to travel to the vehicle to resume operation, requires maintenance, etc.).

S210 can optionally include determining (e.g., detecting, characterizing, identifying, etc.) a scenario associated with the agent S214, which functions to enable particular scenarios that have been found to be most optimally navigated with a remote operator (or a minimal risk maneuver) can trigger a remote operator request in S220 and/or any type of maneuver. A scenario preferably refers to a type of environment surrounding the vehicle, which can be characterized by any or all of: static features (e.g., static infrastructure, road geometries, etc.), dynamic features (e.g., behaviors of other vehicles, presence of known or unknown objects, etc.), or any combination of features.

Additionally or alternatively, S214 can involve a failure of the vehicle to identify any scenario in particular (e.g., based on obstructed sensors, based on the outputs of an anomaly detection subsystem and/or out-of-distribution detection subsystem, etc.).

S214 can be performed in parallel with S212, before S212, after S212, and/or at any other times.

The scenarios can be any or all of: predetermined (e.g., based on a map assignment of scenarios), dynamically determined (e.g., based on object detections, based on passing a geofenced trigger, etc.), or any combination of predetermined and dynamically determined.

Examples of scenarios include, but are not limited to: scenarios related to (e.g., defined by) lane and/or road geometry (e.g., one-way road, two-way road, two-lane road, four-lane road, roadway with a shoulder, roadway with a curb, parking lot, driveway, etc.); scenarios related to road and/or zone types (e.g., residential roads, highways, school zones, commercial zones, construction zones, etc.); scenarios related to a use case of the vehicle (e.g., loading zones, customer sites, load pick-up locations, load drop-off locations, etc.); scenarios defined by certain conditions (e.g., dynamic conditions, predetermined trends, etc.) (e.g., high traffic scenario, inclement weather scenario, etc.); scenarios defined based on the presence and/or behavior of particular objects (e.g., scenario involving children being present, scenario involving unknown objects and/or objects behavior in strange or unexpected ways, etc.); any combination of scenarios; and/or any other suitable scenarios.

In a set of particular specific examples, the scenario is determined (e.g., in part, in full, etc.) based on a context associated with the vehicle's location (e.g., as described in U.S. application Ser. No. 17/116,810, filed 9 Dec. 2020, which is incorporated herein in its entirety by this reference).

Detecting a scenario can optionally be part of the autonomous operation of the agent (e.g., as described in U.S. application Ser. No. 17/116,810, filed 9 Dec. 2020, which is incorporated herein in its entirety by this reference), part of the selection and/or refinement (e.g., filtering) of a set of decision options to send to a remote operator (e.g., as described below), and/or used in any other processes. In preferred variations, S214 includes detecting a context based on a location of the autonomous agent and a map, such as described in U.S. application Ser. No. 17/116,810, filed 9 Dec. 2020, which is incorporated herein in its entirety by this reference. Additionally or alternatively, a context associated with the autonomous agent can be otherwise suitably determined.

In some variations, such as those implemented in a delivery use case (e.g., fixed route delivery of goods, delivery of goods from a warehouse site to a distribution site, etc.) of the AVs, a scenario corresponding to a loading and/or unloading site of the vehicle can be detected and used to trigger a remote operator request in response to reaching that site (e.g., based on a location of the vehicle, based on referencing a map based on the location of the vehicle, based on detecting breaching of a geofenced trigger associated with the site, etc.). In specific examples, for instance, the remote operator request can be used to (e.g., as described below): alert the remote operator to assign a designated loading dock to the vehicle; alert the remote operator to provide waypoints to navigate the vehicle to an available loading dock; alert the remote operator to select a high-level behavior for the AV upon reaching the site (e.g., wait in a particular waiting area because all of the loading docks are occupied, unlock vehicle for unloading at a particular loading dock, etc.); alert the remote operator to take over direct control of the vehicle (e.g., to back it into the loading dock); and/or any other inputs from the remote operator can be requested.

Additionally or alternatively, any other scenarios can trigger particular remote operator requests.

Additionally or alternatively, S210 can include any other processes.

4.2 Method—Triggering a Remote Operator Request S220

The method 200 can include triggering a remote operator request S220, which functions to alert a remote operator to an event in which his or her input is needed and/or desired. Additionally or alternatively, S220 can function to determine which type of remote operator request to trigger, when to trigger a remote operator request, what conditions (e.g., time limits) to attribute to a request, and/or determine any other information. Additionally or alternatively, S220 can perform any other suitable functions.

S220 is preferably performed in response to and based on S210 (e.g., S212, S214, etc.), but can additionally or alternatively be performed in response to any other processes. S220 can additionally or alternatively be performed at any or all of: in response to and/or after a minimal risk maneuver has been initiated (e.g., a first minimal risk maneuver in a tiered set), which can function, for instance, to not rely on the remote operator to implement an initial minimal risk maneuver (e.g., in an event that the remote operator is unavailable); prior to a minimal risk maneuver being initiated (e.g., any minimal risk maneuver, a higher intensity minimal risk maneuver, etc.); in absence of a minimal risk maneuver being triggered; and/or at any other times.

In a first set of variations, a remote operator request is triggered in response to S212, where the remote operator request functions to trigger a set of decision options (e.g., as described in S230) to be sent to the remote operator in response to detecting a failure and/or implementing a failure response (e.g., execution of a minimal risk condition and/or minimal risk maneuver, contacting a remote operator, etc.), such that the remote operator can select a behavior for the agent to implement in order to resume operation from the MRC. In specific examples, for instance, the decision options include behaviors that the autonomous agent could implement to resume driving after coming to a stop as part of an MRC.

In a second set of variations, additional or alternative to the first, a remote operator request is triggered in response to S214, where the remote operator request functions to trigger a set of decision options to be provided to the remote operator. Additionally or alternatively, the remote operator request can trigger an option for direct control of the autonomous agent to the remote operator.

In the second set of variations, the remote operator request can optionally be triggered in response to detecting a particular scenario (e.g., context from a predetermined set of contexts) associated with the autonomous agent. This can include, for instance, detecting a context which has been found to be difficult for the agent to navigate autonomously and/or which otherwise is associated with a predetermined trigger for a remote operator request. Additionally or alternatively, the remote operator request can be triggered based on any other information, such as any or all of: detecting that the agent has been stopped for more than threshold period of time, detecting that an obstacle is impeding progress of the agent and/or that the obstacle is static, detecting that there no other available routes for the autonomous agent to self-elect, detecting that new information from another fleet vehicle and/or a fleet command center has been received, and/or the request can be triggered based on any other information and/or scenarios.

In a first set of specific examples, in which the autonomous agents are used as delivery vehicles and must load and unload cargo, the loading and unloading zones can have dynamically changing locations within the pickup and delivery sites, which can be difficult for the autonomous agent to autonomously adapt and handle. If a context indicating that the autonomous agent has reached a loading and/or unloading site is determined, a request can be sent to the remote operator for input (e.g., an indication of where the site is, direct control commands for the vehicle, the provision of a set of waypoints to navigate the vehicle to a particular location within the site, the selection of a set of paths for navigation of the vehicle within the site, etc.).

In a second set of specific examples, the local computing subsystem detects that an obstacle is preventing movement of the autonomous agent and that the autonomous agent has been static for at least a predetermined threshold of time (e.g., at least 10 seconds, between at least 10 seconds and 2 minutes, etc.). In response, a request is sent to the remote operator, which can include a set of behavior decision options, a set of re-route options (e.g., re-routing of the agent to an alternative and/or backup fixed route, re-routing the agent to a different site, etc.), the option for direct control, and/or any other options. A scenario (e.g., context) of the agent can optionally additionally or alternatively be determined and/or considered, which can function to: refine the decision options presented to the remote operator, determine whether or not to propose a rerouting of the agent to the remote operator, determine whether or not to propose the option for direction control, and/or can perform any other functions.

The remote operator request preferably includes an alert provided at an interface and/or set of output devices (e.g., visual display, audio output device, tactile output device, etc.) associated with a remote operator (e.g., at a remote operator station). In examples, for instance, the alert can include any or all of: a visual alert (e.g., message, notification, and/or annotation provided at a display of a remote operator workstation), audio alert (e.g., provided at an audio output device of a remote operator workstation, provided at a mobile device of the remote operator, etc.), tactile alert (e.g., vibration provided at a handheld device [e.g., joystick, gear shift, etc.] of the remote operator), and/or any other alerts or combination of alerts.

S220 can additionally or alternatively function to determine what types of outputs (equivalently referred to herein as options) are provided to the remote operator in S230, and/or trigger any or all of the output provision in S230.

Additionally or alternatively, S220 can include any other suitable processes.

4.3 Method—Presenting a Set of Outputs to a Remote Subsystem S230

The method 200 can include presenting a set of outputs to a remote subsystem S230, which functions to prompt an input from the remote operator, alert him or her to a particular scenario (e.g., context) and/or situation (e.g., trigger of an MRC) associated with the vehicle, and/or provide information to the remote operator for decision making. Additionally or alternatively, S230 can perform any other functions.

S230 is preferably performed in response to S220 (e.g., in an event that S220 is performed). Additionally or alternatively, S230 can be performed in response to another process of the method 200 (e.g., in response to S210), multiple times (e.g., continuously) during the method 200, in absence of S220, and/or at any other times.

The set of outputs is preferably provided at a set of output devices (e.g., display, touch screen interface, etc.) of a set of one or more interfaces (e.g., as described above) associated with a remote operator (e.g., as described above), but can additionally or alternatively be provided at any other devices and/or in any other ways. The remote operator is preferably arranged remote from the autonomous agent, such as at a remote center which hosts the set of remote interfaces (e.g., at a set more remote monitor workstations). Alternatively, the remote operator can be located onboard the autonomous vehicle (e.g., as an onboard human operator, as a safety driver, etc.) and/or otherwise located.

In a preferred set of variations, a remote operator monitors multiple autonomous vehicles. In alternative variations, a remote operator can monitor a single autonomous vehicle in a 1:1 fashion, multiple remote operators can monitor a single vehicle, and/or any combination of monitoring arrangements can be implemented.

The outputs provided in S230 preferably include sensor information (e.g., sensors streams, sensor data, etc.) collected at any or all of the sensor subsystem to the remote subsystem, such that it can be viewed by remote operators at the remote interfaces. The sensor information is preferably continuously provided as a sensor stream (e.g., a video stream from one or more cameras, a sensor stream from fused sensor data, etc.), but can additionally or alternatively be provided intermittently, in response to a trigger (e.g., S220), and/or at any other time(s).

In a preferred set of variations, the remote operators are provided with streams of data from one or more optical sensors (e.g., cameras) onboard the vehicle, which functions to enable the remote operators to view what the vehicle is perceiving in its environment. This can include any or all of: individual camera streams (e.g., video streams), aggregated camera streams (e.g., from multiple cameras), processed camera streams (e.g., edited, cropped, modified, etc.), and/or any other optical sensor data.

Additionally or alternatively, the remote operators can be provided with data (e.g., raw data, processed data, etc.) from any other sensors (e.g., Lidar, Radar, etc.) onboard or otherwise associated with the vehicle. This additional sensor data can be combined with (e.g., overlaid on, fused with, etc.) the optical sensor data, provided in an additional manner relative to the optical sensor data, provided upon request, and/or otherwise suitably provided.

In a set of examples, for instance, determinations (e.g., perception determinations, object detections, object characterizations, etc.) made by the vehicle regarding its environment are indicated to the remote operator (e.g., through annotated image data, through outlined objects in image data, etc.).

In a particular specific example, objects which are identified by the vehicle's perception subsystem are shown (e.g., highlighted, annotated, etc.) to the remote operator, wherein the remote operator can optionally provide feedback (e.g., as described below) related to any inaccuracies in the vehicle's perception and/or environmental understanding (e.g., which can be provided as feedback to the vehicle [e.g., to the vehicle's processing and/or computing subsystem] for revisions in its perception and/or any downstream decision-making).

S230 further preferably includes optionally providing a set of decision options to the remote operator (e.g., in response to/as part of the decision request in S220). S230 can additionally or alternatively include determining (e.g., selecting) which outputs and/or types (e.g., categories) of outputs are presented to the remote operator at the remote subsystem.

The set of decision outputs is preferably determined at least in part based on any or all of: a detected and/or characterized failure (e.g., as determined in S212), a detected and/or characterized scenario (e.g., as determined in S214), a type of minimal risk maneuver (e.g., which has already been implemented, which is part of an ordered list of minimal risk maneuver options, etc.) associated with a failure response of the vehicle, and/or any other information. Additionally or alternatively, the set of decision options can be determined and/or refined based on any or all of: a set of safety analyses (e.g., as described in S250), previous instances of S240 (e.g., previous remote operator input), instances and/or previous instances of any other processes of the method, and/or any other information.

Determining the decision options can optionally further include determining (e.g., prescribing) a set of conditions (e.g., parameters) associated with the decision options presented to the remote operator, such as, but not limited to: time limits with which the remote operator needs to respond for his or her input to be considered (e.g., time before a next minimal risk maneuver is triggered by the vehicle); a number of decision options which the remote operator can select; and/or any other conditions.

In a preferred set of variations, input from the remote operator is always and/or at least sometimes optional, such that the AV will operate (e.g., enter a minimal risk maneuver) with or without input from the remote operator. In such cases, time limits can be provided to the remote operator which indicates how long they have to provide their optional input in order for it to be considered (and/or be likely to be considered if the failure level does not progress) by the vehicle.

The conditions associated with the decision options can be determined based on any or all of the features described above for determining the decision options (e.g., failure detection and/or characterization, scenario characterization, etc.) and/or based on any other information.

In some variations, for instance, a severity and/or frequency of a detected failure can be used to determine the amount of time provided to the remote operator for making a decision before the vehicle autonomously selects a next action (e.g., next minimal risk maneuver, more severe minimal risk maneuver, etc.)

The decision options and/or associated conditions can be determined based on any or all of: a set of lookup tables, a set of databases, a set of models and/or algorithms (e.g., learned and/or trained models and/or algorithms, rule-based models and/or algorithms, etc.), a set of decision trees, historical information (e.g., historical success rates associated with previous vehicle actions, an aggregated corpus of historical vehicle data, etc.), and/or with any combination of tools.

The set of decision options can optionally include a set of behaviors and/or actions for the autonomous agent. The behavior and/or action options that are presented to the remote operator can optionally be refined (e.g., filtered, prioritized, etc.) based on any or all of: a scenario and/or context of the agent (e.g., based on the position of the agent relative to a map); a use case (e.g., delivery use case) and/or operational design domain (e.g., fixed routes) of the vehicle; weather, traffic, and/or any other conditions; a detected failure and/or characterization of failure of the vehicle; and/or any other information. Alternatively, the option types provide to the remote operator can be predetermined and/or static (e.g., the same among all scenarios).

The behaviors/actions (equivalently referred to herein as interventions) in the set of decision options can optionally include behaviors (e.g., high-level behaviors and/or goals) and/or actions that the agent cannot elect itself and/or behaviors/actions that the agent cannot elect itself in the present context (e.g., cannot itself elect driving into a lane designated for opposing traffic on a two-way road but can itself elect driving into a lane designated for opposing traffic in a parking lot). Additionally or alternatively, the behaviors/actions can include those that the agent can itself elect, any other behaviors/actions, and/or any combination of behaviors/actions.

In a set of examples (e.g., as shown in FIG. 4), the set of behavior and/or action options includes any or all of: borrowing a neighboring lane, ending the current trip and/or initiating a new trip, initiating the return of the vehicle to a base location, rerouting the vehicle to a safe stop (e.g., a closest safe stop from a predetermined set of validated, dedicated locations [e.g., parking lots, gas stations, etc.] labeled on a map; a covered location indicated on a map in response to a hail storm advance warning or other weather condition [e.g., snow, rain, lightning, etc.]; etc.), rerouting the vehicle to an alternate route (e.g., which has the same destination as the original route), pulling over the vehicle (e.g., to a curbside and/or shoulder), stopping the vehicle in the lane (e.g., at its current position), having the vehicle come to a gentle (e.g., gradual, over a minimum distance, with a maximum deceleration, etc.) stop, coming to a stop at a single waypoint (e.g., wherein the waypoint is provided by the remote operator), docking at a loading dock, driving at a set speed or set of speeds (e.g., in response to a change in speed limit for a construction zone that is not yet in view, in response to the detected presence of children near the roadway, etc.), and/or any other behaviors/actions.

Additionally or alternatively, the set of interventions can include any or all of the actions as described in any or all of: U.S. application Ser. No. 17/116,810, filed 9 Dec. 2020, U.S. application Ser. No. 17/125,668, filed 17 Dec. 2020, U.S. application Ser. No. 17/127,599, filed 18 Dec. 2020, each of which is incorporated herein in its entirety by this reference.

In a set of particular specific examples, the set of behavior and/or action options (e.g., return to base, reroute to a safe stop, reroute to an alternative fixed route, approach a loading dock, etc.) are determined at least in part based on a fixed route, delivery use case for the vehicle.

In another particular example, the detection of an object which is behaving in an unexpected manner (e.g., bicycle swerving, object repeatedly crossing lane lines, etc.), such as indicated by an uncertainty level associated with the object, the remote operator can be provided with a set of behavior options for what the vehicle should do in response, such as, but not limited to: staying behind the object, going around the object, slowing down, waiting until a predetermined space ahead of the vehicle is clear, proceeding as planned, pulling over to the side of the road, coming to a stop, and/or any other behaviors.

Additionally or alternatively, the set of decision options can include the option for a remote operator to take direct control of the vehicle (e.g., as shown in FIG. 4) in which the remote operator provides control commands for the vehicle directly from a remote interface. As such, the remote interface preferably includes one or more input devices, such as joysticks, brake pedals, accelerator pedals, steering wheels, and/or any other input devices which the remote operator can manipulate/control.

The option for direct control is preferably selectively provided, such as in response to the detection of a particular subset of scenarios (e.g., in response to a particular context such as a loading/unloading zone context), etc.), but can additionally or alternatively be provided in response to a particular minimal risk maneuver being selected and/or implemented, consistently provided in all scenarios and/or situations, in response to a particular failure severity, and/or otherwise suitably provided.

In a set of examples, for instance, a remote operator can be provided with the option to provide direct control commands for backing up the vehicle into a loading dock (e.g., once it is detected that the vehicle has arrived at a loading/unloading site). In a particular specific example, the remote operator can provide direct control commands in response to receiving an input or alert (e.g., notification) associated with the site (e.g., from a site worker, from another fleet vehicle at the site, from a site management subsystem, from a fleet command center, etc.) that the site is ready and available for the vehicle to dock (e.g., at a particular loading dock). Further additionally or alternatively, the remote operator can provide high-level docking instructions (e.g., where to dock, when to dock, where to wait, etc.).

Additionally or alternatively, the set of decision options can include the option for the vehicle to take and/or divert to an alternative fixed route (and/or end location and/or order of destinations) with respect to the fixed route currently planned for and/or being traveled by the vehicle. In a set of variations, for instance, the vehicles operate along a fixed route network which enables the vehicle to travel between different customer sites (e.g., loading/unloading sites, loading docks, warehouses, distribution centers, etc.), base stations (e.g., home sites), maintenance sites, and/or any other locations. The decision option to take an alternative route can be any or all of: continuously provided to a remote operator, triggered based on sensor data and/or its analysis, triggered based on a static waiting time of the vehicle exceeding a predetermined threshold, triggered based on input from a fleet command center associated with the vehicle, triggered based on traffic conditions, triggered based on information from another vehicle of the fleet (e.g., fleet vehicle arranged at the current planned destination for the vehicle which indicates that the destination is overcrowded), triggered based on a detected failure and/or scenario, and/or can be otherwise suitably provided to the remote operator.

In a set of variations, for instance, an option for the vehicle to take an alternative route can be provided upon determining (e.g., automatically based on sensor data, automatically based on $3^{rd}$ party traffic information, manually by a remote operator, etc.) that the current route is backed up, congested, and/or otherwise non-optimal for the vehicle. In a set of examples, the remote operator chooses to select an alternative route for the vehicle upon determining, based on looking at camera data from the vehicle, that there is an obstruction ahead of the vehicle (and/or that there is likely to be an obstruction ahead of the vehicle) which is causing traffic to be significantly backed up.

Additionally or alternatively, the set of decision options can include commands for vehicle indicators and/or supplementary subsystems, such as, but not limited to: light indicators (e.g., blinkers), heating and/or cooling units (e.g., A/C units), windshield wipers, gas tank coverings, and/or any other subsystems.

Additionally or alternatively, the set of decision options can provide the remote operator with the ability to inform and/or change the vehicle's current understanding of its environment, such as object information determined with the vehicle's perception subsystem. For instance, a vehicle might perceive an object (e.g., object type, object intent, etc.) incorrectly and/or with a high level of uncertainty (e.g., which might trigger a warning or error), where the remote operator can tell that the object has been mis-identified. In such instances, the remote operator can provide information which corrects this perception information (e.g., identifies what object type the object is from a set of options), where this additional information can be considered by and optionally used by (e.g., to adjust its perception understanding) the vehicle.

In some examples, for instance, a remote operator request can be triggered for clarification (e.g., selection of an object type from a set of multiple objects) in response to the perception system of the vehicle detecting an object with a high level of uncertainty (e.g., uncertainty above a predetermined threshold). Additionally or alternatively, the remote operator can provide feedback without being specifically requested. In a specific example, a remote operator can indicate that a potential child detected by the perception system is actually a static object (e.g., mailbox).

Additionally or alternatively, the remote operator can provide a set of waypoints to the vehicle (e.g., vehicle planner), which can be used by the vehicle for determining a path (e.g., trajectory) to follow (e.g., with a classical motion planner). Waypoints can be provided, for instance, in response to any or all of: detecting that the vehicle is stuck (e.g., has not changed locations for at least a predetermined amount of time), detecting that the vehicle's planner is experiencing a failure, detecting a particular type of scenario (e.g., construction zone, loading dock site, etc.), and/or at any other times or in any other situations.

Additionally or alternatively, the remote operator can provide a path for the vehicle (e.g., set of waypoints, continuous path, selected path from a set of path options for the vehicle, etc.).

Additionally or alternatively, any other options can be provided to the remote operator at a remote subsystem.

4.4 Method—Receiving an Input from a Remote Operator S240

The method 200 can include receiving an input from a remote operator S240, which functions to receive information which the vehicle can optionally use in its operation (e.g., navigation out of an MRC, navigation within a challenging context, navigation within a context best suited for a human driver, etc.), decision-making, and/or any other use cases.

S240 is preferably performed in response to and based on S230, but can additionally or alternatively be performed in response to any other processes.

Additionally or alternatively, S240 can be performed without providing a set of outputs and/or options to a remote operator, such as in events where the vehicle has not yet detected a failure and/or the need/desire for assistance from the remote operator.

As described above, the input can include any or all of: a behavior and/or action selection, control commands (e.g., throttle and/or steering and/or braking control commands in a direct control operation mode), waypoints, a path, perception adjustments, any other information, or any combination of information.

Additionally or alternatively, S240 can include any other processes.

4.5 Method—Processing the Remote Operator Input S250

The method 200 can optionally include processing the input S250, which preferably functions to validate that the input is satisfactory (e.g., relative to safety, relative to a goal of the autonomous agent, relative to thresholds associated with the actuation subsystem, etc.) for the autonomous agent to implement. Additionally or alternatively, S250 can function to alter/adjust the input (e.g., to make satisfactory for the agent to implement), reject the input (e.g., and instead trigger a minimal risk condition), and/or can perform any other functions.

S250 is preferably performed in response to and based on S240, but can additionally or alternatively be performed in response to any other processes of the method 200, prior to and/or during any other processes of the method, based on any other information (e.g., inputs received in S210), and/or S250 can be otherwise suitably performed.

In some variations, S250 is performed prior to and/or during S240, wherein only options that have been validated are provided to the remote operator.

In additional or alternative variations, S250 is performed while a remote operator is providing feedback (e.g., an initial subset of waypoints) such that in an event that the remote operator's inputs are not validated, the remote operator can be alerted (e.g., such that the remote operator does not continue to spend time providing additional information which will not be implemented).

The inputs from the remote operator are preferably processed at the local subsystem 120, further preferably at a local computing subsystem (e.g., AV computer) arranged onboard the autonomous agent, which functions to pass the input through the AV logic of the local computing subsystem, thereby giving the autonomous agent the authority to validate and implement the input, as well as optionally providing an extra layer of safety to implementing a human input. Additionally or alternatively, the input can be processed at the remote subsystem 110, at another computing/processing subsystem, and/or at any combination of locations.

Alternatively, the input can be implemented in absence of validation, processing, and/or receipt at the local computing subsystem.

Processing the input preferably includes evaluating the input (or a derivative of the input such as a trajectory determined based on the input) against a set of safety constraints and/or other satisfaction criteria. This preferably applies to at least control command inputs received during a direct control operation mode of the remote operator, but can additionally or alternatively be applied to a selected behavior/action, control commands generated at the AV logic, and/or any other inputs.

Figure 5:
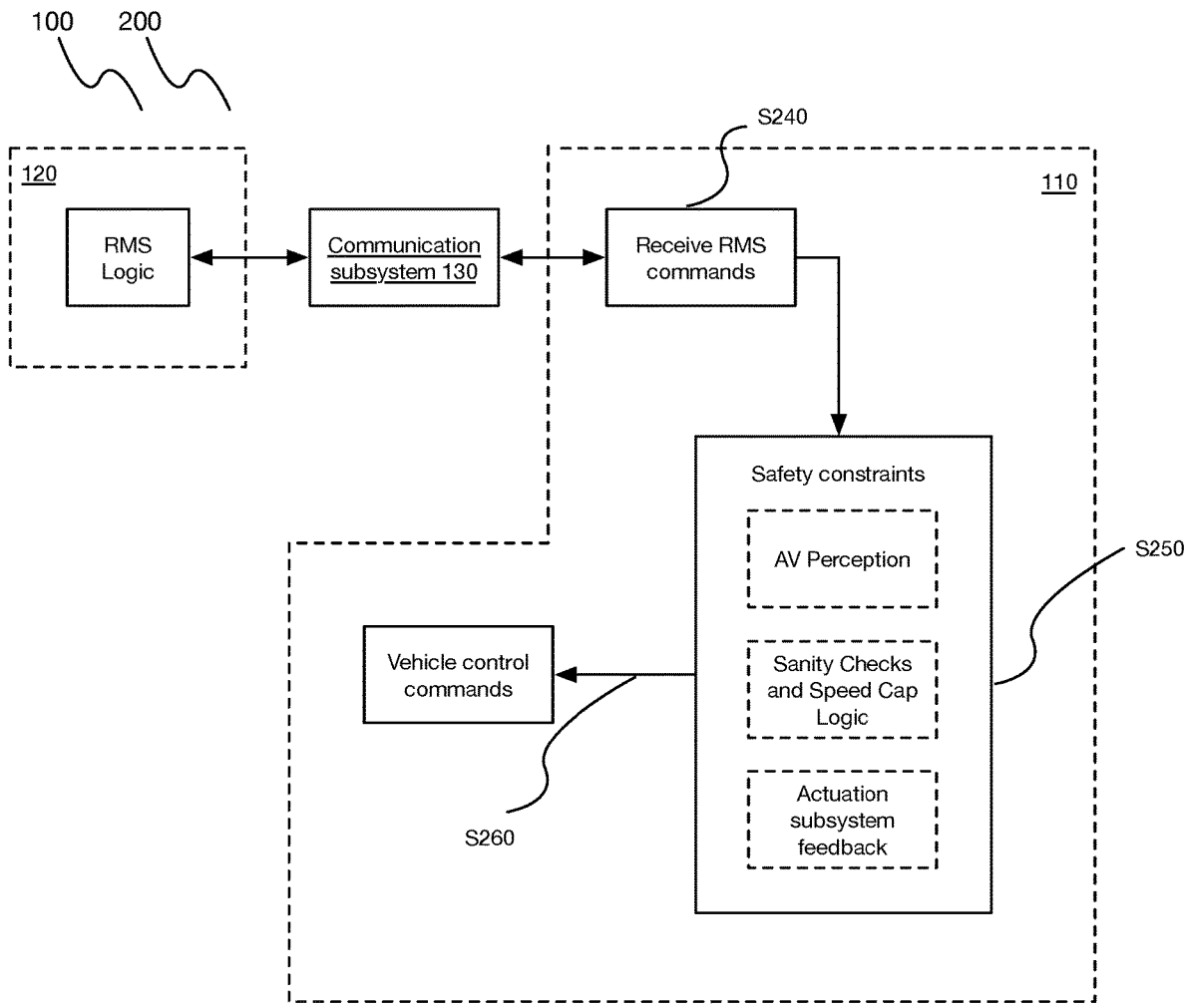
FIG. 5 depicts a schematic variation of a system for operating an autonomous agent with a remote operator and an associated method of use.

The safety constraints can include and/or be determined based on (e.g., as shown in FIG. 5) any or all of: information from an AV perception module associated with the agent (e.g., is the vehicle in the context that it thinks it is, is there enough space to execute the control commands, etc.); sanity checks (e.g., rule-based constraints) and/or speed cap logic (e.g., do the control commands cause the vehicle to exceed a speed limit or other speed threshold, do the control commands cause the vehicle to fall below a minimum speed threshold, etc.); feedback from an actuation subsystem of the vehicle (e.g., can the control commands be implemented based on the current state of the vehicle); and/or any other information.

In a specific example, for instance, a remote operator makes a decision selection to return to base, which is communicated to AV logic of the local computing subsystem onboard the agent. However, inclement weather detected by the sensor subsystem causes the AV logic to reject this decision, which can then trigger a repeat in any or all of the earlier processes of the method (e.g., S210, S220, etc.). This could optionally cause this decision option to be withheld from presenting to the remote operator in the next iteration of S230. Additionally or alternatively, the decision option can be included again, the decision options can be automatically filtered by weather conditions, and/or the method can be otherwise suitably performed.

In an additional or alternative set of variations, a preemptive warning and/or rejection of inputs provided by a remote operator can be provided to the remote operator. In an example, for instance, if a remote operator is entering waypoints and one or more requires passing through a predetermined/static object in a map, the remote operator can be alerted that the waypoints they are providing will not be viable for the vehicle to implement. This can function to prevent mistakes and/or dangers (e.g., collisions) from occurring due to the remote operator and/or limit the amount of time the remote operators spend on a task that is not viable (e.g., in events where multiple vehicles are monitored by a single remote operator).

In an additional or alternative set of variations, a remote operator selects a behavior for the vehicle that involves the vehicle pulling over to a curbside. In examples, S250 includes: verifying that a curbside is present and that the vehicle is able to reach it (e.g., based on time, speed, objects near the vehicle, etc.) without risk of a collision; determining a trajectory for the vehicle (e.g., with a conventional planning approach rather than with a learned/trained model); and operating the vehicle (e.g., in S260) according to the trajectory. In an event that the vehicle is unable to reach the curbside, a minimal risk maneuver (e.g., slowing down, coming to a stop, etc.) can additionally or alternatively be implemented.

4.6 Method—Operating the Autonomous Agent S260

The method 200 can include operating the autonomous agent S260, which functions to control the autonomous agent.

S260 is preferably performed in response to S250 and/or S240, but can additionally or alternatively be performed in response to any other processes, in absence of any other processes (e.g., in an event that a remote operator is not triggered), multiple times (e.g., continuously), and/or at any other time(s).

The autonomous agent can be operated based on any or all of: the input received from the remote operator, a processed input from the remote operator (e.g., as validated in S250), control commands generated by the autonomous agent (e.g., in an event that the remote operator is not triggered, in an event that an input from the remote operator does not satisfy the safety constraints, etc.), and/or any other information. Additionally or alternatively, in an event that a remote operator is triggered and an input from the remote operator is not implemented (e.g., due to failing validation), the autonomous agent can remain in an MRC (e.g., stopped), until any or all processes of the method are repeated and/or until the autonomous agent can autonomously navigate its environment.

Additionally or alternatively, S260 can include any other processes.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for utilizing remote operator input in an operation of an autonomous vehicle, the method comprising:
   receiving a set of sensor inputs at a sensor subsystem of the autonomous vehicle;
   processing the set of sensor inputs with:
      a set of trained models at a computing subsystem of the autonomous vehicle to characterize a scenario associated with the autonomous vehicle; and
      a diagnostic aggregator of the autonomous vehicle to determine an aggregated predicted failure score of the autonomous vehicle;
   comparing the aggregated predicted failure score with a set of multiple predetermined thresholds, wherein each threshold is associated with a different category of severity for a single subsystem of the autonomous vehicle, the set of multiple predetermined thresholds comprising at least a first threshold and a second threshold, the second threshold separate and distinct from the first threshold, wherein:
      in an event that the aggregated predicted failure score exceeds the first threshold of the set of multiple predetermined thresholds, a first failure response is initiated; and
      in an event that the aggregated predicted failure score exceeds the second threshold of the set of multiple predetermined thresholds, a second failure response is initiated;
   determining that the characterized scenario is within a first subset of predetermined scenarios;
   responsive to determining that the characterized scenario is within the first subset of predetermined scenarios, presenting information to a remote operator, the information comprising
      a predefined set of behavior options for the vehicle;
   determining that the characterized scenario is within a second subset of predetermined scenarios;
   responsive to determining that the characterized scenario is within the second subset of predetermined scenarios, presenting
      a set of remote operator input options enabling the remote provider to provide a set of control commands for actuators of the autonomous vehicle to the remote operator
   receiving an input from the remote operator;
   comparing the input with a set of constraints determined based on the set of sensor inputs;
   validating the input by on comparing the input with the set of constraints; and
   maneuvering the autonomous vehicle based on the validated input.

2. The method of claim 1, wherein the set of remote operator input options is determined based on the characterized scenario, wherein the characterized scenario is determined to be within the second subset of the predetermined scenarios, and wherein the second subset of predetermined scenarios comprises an arrival of the autonomous vehicle at a loading dock site.

3. The method of claim 2, wherein the arrival of the autonomous vehicle at the loading dock site is detected based on a predetermined map and a geofence associated with the loading dock site.

4. The method of claim 2, wherein the information presented to the remote operator further comprises a notification from at least one of: a fleet command center, a second autonomous vehicle arranged at the loading dock site, or a user interface associated with a site worker located at the loading dock site, wherein the notification comprises an identifier for a particular loading dock at the loading dock site.

5. The method of claim 1, wherein the second predetermined threshold has a higher value than the first predetermined threshold.

6. The method of claim 1, wherein the first failure response comprises transmitting an alert to the remote operator, wherein the information comprises the alert.

7. The method of claim 6, wherein the first failure response is separate and distinct from the second failure response, and wherein the method further comprises initiating the second failure response, the second failure response comprising autonomously operating the autonomous vehicle according to a minimal risk maneuver selected from a set of multiple predetermined minimal risk maneuvers.

8. The method of claim 7, wherein the minimal risk maneuver is a first in the set of multiple predetermined minimal risk maneuvers, wherein the set of multiple predetermined minimal risk maneuvers is an ordered list of minimal risk maneuvers ordered in increasing intensity, wherein the selected minimal risk maneuver has a lowest intensity.

9. The method of claim 8, wherein the increasing intensity comprises an increasing value in braking applied by a set of brakes of the autonomous vehicle.

10. The method of claim 8, wherein maneuvering the autonomous vehicle based on the validated input prevents at least one of:

the first failure response from escalating into the second failure response; and a second minimal risk maneuver in the ordered list of minimal risk maneuvers from being implemented.

11. The method of claim 1, wherein the second failure response comprises autonomously implementing a minimal risk maneuver for the autonomous vehicle, wherein the minimal risk maneuver is implemented absent of the input from the remote operator.

12. The method of claim 1, wherein at least a portion of the information presented to the remote operator are each associated with a time duration limit for monitoring for input from the remote operator.

13. The method of claim 12, wherein a first time duration limit is associated with information provided in response to initiation of the first failure response, and wherein a second time duration limit is associated with information provided in response to initiation of the second failure response, wherein the first duration limit is greater than the second duration limit.

14. The method of claim 13, wherein in an event that at least one of the first time duration limit and the second time duration limit is exceeded, the method further comprises implementing a minimal risk maneuver for the autonomous vehicle.

15. The method of claim 1, wherein the input from the remote operator comprises a selection of an alternative fixed route for the autonomous relative to a current fixed route being traversed by the autonomous vehicle.

16. The method of claim 1, further comprising:
receiving a next set of sensor inputs at the sensor subsystem of the autonomous vehicle;
determining a next characterized scenario using the set of trained models based on the next set of sensor inputs; and
in an event that any or all are satisfied:
the next characterized scenario is within the first subset of predetermined scenarios, wherein a next set of remote operator input options comprises a next set of behavior options for the vehicle;
the next characterized scenario is within the second subset of predetermined scenarios, wherein the next set of remote operator input options enables the remote operator to provide at least one of:
a next set of control commands for actuators of the autonomous vehicle; or
a set of locations for the autonomous vehicle to pass through; or
at least one of the first and second failure responses is initiated, presenting a next set of information to the remote operators, wherein the next set of information comprises:
the next set of sensor inputs; and
the next set of remote operator input options determined based on at least one of:
the next characterized scenario; or
a next aggregated predicted failure score determined by the diagnostic aggregator.

17. The method of claim 16, wherein providing the set of locations for the autonomous vehicle to pass through comprises providing at least one of: a set of waypoints for the autonomous vehicle and a path for the autonomous vehicle.

18. The method of claim 17, wherein the set of locations comprises the set of waypoints, wherein the autonomous vehicle generates a trajectory based on the set of waypoints and with a classical motion planner.

19. The method of claim 1, further comprising: automatically selecting the predefined set of behavior options from a plurality of predefined behavior options based on the set of sensor inputs before presenting the information to the remote operator.

20. The method of claim 1, wherein each threshold in the set of multiple predetermined thresholds is associated with a different subsystem of the autonomous vehicle.

21. The method of claim 1, wherein enabling the remote operator to provide a set of control commands comprises enabling direct remote control of the actuators of the autonomous vehicle.

22. The method of claim 21, wherein enabling direct remote control of the actuators of the autonomous vehicle comprises receiving physical control inputs from the remote operator at a physical input; and converting the physical control inputs into actuator control commands.

* * * * *